(12) United States Patent
Li et al.

(10) Patent No.: US 11,941,201 B2
(45) Date of Patent: Mar. 26, 2024

(54) DISPLAY PANEL AND DISPLAY DEVICE

(71) Applicant: Shanghai Tianma Micro-Electronics Co., Ltd., Shanghai (CN)

(72) Inventors: Zhe Li, Shanghai (CN); Feng Lu, Shanghai (CN)

(73) Assignee: Shanghai Tianma Micro-Electronics Co., Ltd., Shanghai (CN)

(*) Notice: Subject to any disclaimer, the term of this patent is extended or adjusted under 35 U.S.C. 154(b) by 0 days.

(21) Appl. No.: 17/831,182

(22) Filed: Jun. 2, 2022

(65) Prior Publication Data
US 2022/0350457 A1 Nov. 3, 2022

(30) Foreign Application Priority Data

Sep. 13, 2021 (CN) .......................... 202111070440.0

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0443* (2019.05); *G06F 2203/04103* (2013.01)

(58) Field of Classification Search
CPC ......... G06F 3/04164; G06F 3/041–047; G06F 2203/041–04114; G06F 3/0412; H10K 59/00–95; H10K 59/8445; H10K 59/40; H10K 59/131; H10K 50/844
See application file for complete search history.

(56) References Cited

U.S. PATENT DOCUMENTS

| | | | | |
|---|---|---|---|---|
| 2017/0262109 | A1* | 9/2017 | Choi | H10K 59/122 |
| 2018/0053810 | A1* | 2/2018 | Jin | G06F 3/0412 |
| 2018/0329552 | A1* | 11/2018 | Song | G06F 3/0443 |

FOREIGN PATENT DOCUMENTS

| | | |
|---|---|---|
| CN | 1568543 A | 1/2005 |
| CN | 106125424 A | 11/2016 |
| CN | 107180852 A | 9/2017 |
| CN | 107742477 A | 2/2018 |
| CN | 111564455 A | 8/2020 |
| CN | 112558360 A | 3/2021 |
| CN | 112667106 A | 4/2021 |

OTHER PUBLICATIONS

Chinese Office Action dated Sep. 15, 2023, issued in related Chinese Application No. 2021110704400, 15 pages.

* cited by examiner

*Primary Examiner* — Sanjiv D. Patel
(74) *Attorney, Agent, or Firm* — CHRISTENSEN O'CONNOR JOHNSON KINDNESS PLLC

(57) ABSTRACT

A display panel and a display device are provided. The display panel includes: at least one first touch line and at least one second touch line that are located in different layers; and a first dielectric layer located between the at least one first touch line and the at least one second touch line. The display panel has a first region and a second region, in the second region, one of the at least one first touch line is electrically connected to one of the at least one second touch line by passing the first dielectric layer. A thickness A of the first dielectric layer in the first region in a direction perpendicular to a plane of the display panel, and a thickness B of the first dielectric layer in the second region in the direction perpendicular to the plane of the display panel satisfy: $A > B \geq 0$.

20 Claims, 13 Drawing Sheets

DISPLAY PANEL AND DISPLAY DEVICE

CROSS-REFERENCE TO RELATED APPLICATIONS

The present application claims priority to Chinese Patent Application No. 202111070440.0, filed on Sep. 13, 2021, the content of which is incorporated herein by reference in its entirety.

TECHNICAL FIELD

The present disclosure relates to the field of display technology, in particular to a display panel and a display device.

BACKGROUND

With the continuous development of science and technology, more and more display devices are widely used in people's daily life and work, and become indispensable tools for people today. Moreover, with continuous development of display technology, consumers' requirements for displays continue to increase, and various displays are emerging, such as the liquid crystal display, the organic light-emitting display and other display technologies. On this basis, technologies such as 3D display, touch display, curved display, and ultra-high resolution display are emerging.

For touch display panels, in related technologies, a large number of touch lines for transmitting touch signals are provided in a non-display region of the display panel, resulting in a larger area of the non-display region of the display panel.

SUMMARY

In a first aspect of the present disclosure, a display panel is provided. The display panel includes: touch lines including at least one first touch line and at least one second touch line, the at least one first touch line and the at least one second touch line are located in different layers; and a first dielectric layer located between the at least one first touch line and the at least one second touch line. The display panel includes a first region and a second region, in the second region, one of the at least one first touch line is electrically connected to one of the at least one second touch line through the first dielectric layer. A thickness A of the first dielectric layer in the first region in a direction perpendicular to a plane of the display panel, and a thickness B of the first dielectric layer in the second region in the direction perpendicular to the plane of the display panel satisfy: $A > B \geq 0$.

In a second aspect of the present disclosure, a display device is provided. The display device includes a display panel, including: touch lines including at least one first touch line and at least one second touch line, the at least one first touch line and the at least one second touch line are located in different layers; and a first dielectric layer located between the at least one first touch line and the at least one second touch line. The display panel includes a first region and a second region, in the second region, one of the at least one first touch line is electrically connected to one of the at least one second touch line through the first dielectric layer. A thickness A of the first dielectric layer in the first region in a direction perpendicular to a plane of the display panel, and a thickness B of the first dielectric layer in the second region in the direction perpendicular to the plane of the display panel satisfy: $A > B \geq 0$.

BRIEF DESCRIPTION OF DRAWINGS

In order to more clearly explain the embodiments of the present disclosure, the drawings used in the description of the embodiments or the related art will be briefly described below. The drawings in the following description are some embodiments of the present disclosure. Those skilled in the art can obtain other drawings based on these drawings.

DESCRIPTION OF EMBODIMENTS

In order to better illustrate the technical solutions of the present disclosure, embodiments of the present disclosure will be described in detail below with reference to the accompanying drawings.

It should be clear that the described embodiments are only some of the embodiments of the present disclosure, rather than all the embodiments. Based on the embodiments of the present disclosure, other embodiments obtained by those of ordinary skill in the art shall fall within the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there can be three relations, e.g., A and/or B can indicate A alone, both A and B, and B alone. In addition, the symbol "/" in the context generally indicates that the relation between the objects in front and at the back of "/" is an "or" relationship.

It should be understood that although the terms "first" and "second" can be used in the embodiments of the present disclosure to describe touch lines, these touch lines should not be limited to these terms. These terms are only used to distinguished touch lines from each other. For example, without departing from the scope of the embodiment of the present disclosure, the first touch line can also be referred to as the second touch line, and similarly, the second touch line can also be referred to as the first touch line.

Figure 1:
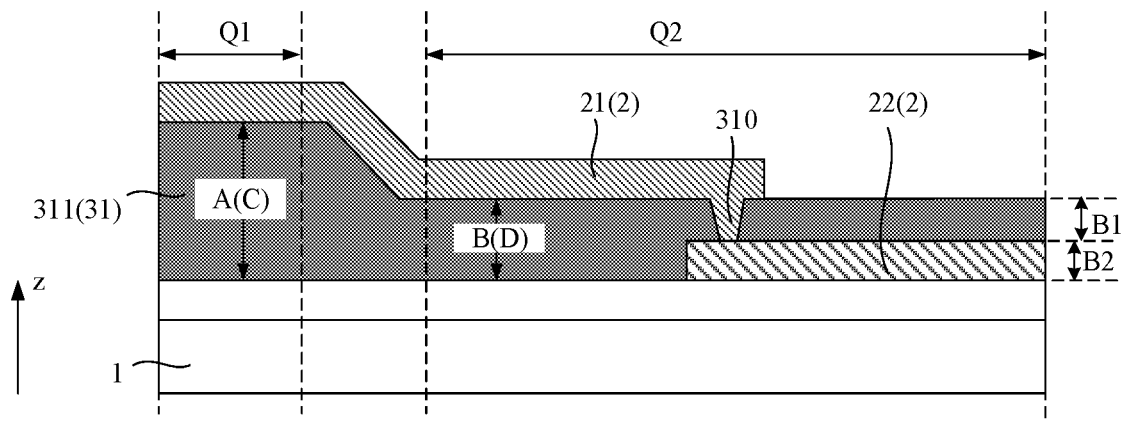
FIG. 1 is a cross-sectional view of a partial region of a display panel provided by an embodiment of the present disclosure.

An embodiment of the present disclosure provides a display panel. FIG. 1 is a cross-sectional view of a partial region of a display panel provided by an embodiment of the present disclosure. As shown in FIG. 1, the display panel includes a substrate 1 and touch lines 2. The touch line 2 is located on a side of the substrate 1. The display panel further includes touch electrodes (not shown in FIG. 1). The touch electrode and the touch line 2 are electrically connected to each other. As shown in FIG. 1, the touch lines 2 include a first touch line 21 and a second touch line 22 that are electrically connected to each other. The first touch line 21 and the second touch line 22 are configured to transmit touch signals. Exemplarily, the region shown in FIG. 1 can be located in a non-display region of the display panel.

Exemplarily, in an embodiment of the present disclosure, the first touch line 21 and the second touch line 22 may be arranged in different layers. The first touch line 21 and the second touch line 22 being arranged in different layers indicates that the first touch line 21 and the second touch line 22 are located in different horizontal planes, that is, a distance between a plane of the first touch line 21 and the substrate 1 is different from a distance between a plane of the second touch line 22 and the substrate 1. The first touch line 21 and the second touch line 22 being located in different horizontal planes is exemplarily illustrated with reference to a case where the display panel is parallel to the horizontal plane.

In the embodiment of the present disclosure, as shown in FIG. 1, along a direction z perpendicular to a plane of the display panel, the display panel further includes a first dielectric layer 31 provided between the first touch line 21 and the second touch line 22.

Figure 2:
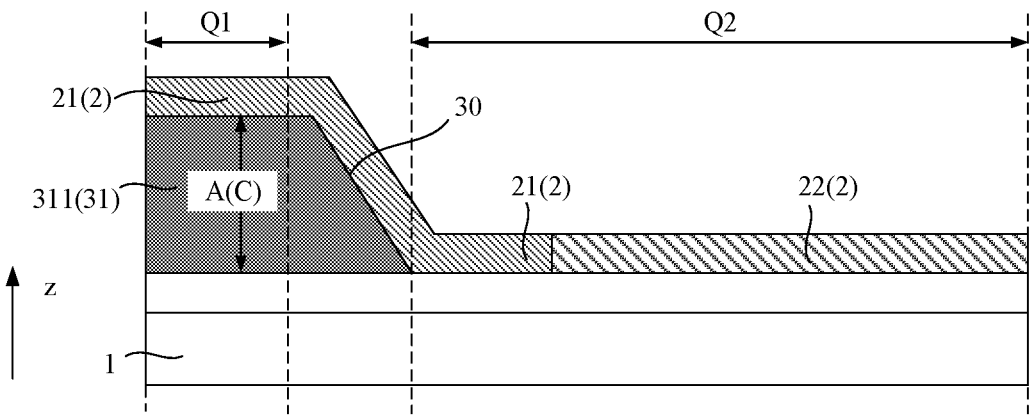
FIG. 2 is a cross-sectional view of a partial region of a display panel provided by another embodiment of the present disclosure.

Exemplarily, a thickness of the first dielectric layer 31 varies at different positions. As shown in FIG. 1, the display panel is at least divided into a first region Q1 and a second region Q2. Along the direction z perpendicular to the plane of the display panel, a thickness A of the first dielectric layer 31 in the first region Q1 and a thickness B of the first dielectric layer 31 in the second region Q2 are different and satisfy: A>B≥0. FIG. 1 illustrates a B≥0 scenario, that is, the first dielectric layer 31 is also provided in the second region Q2. FIG. 2 is a cross-sectional view of a partial region of a display panel provided by another embodiment of the present disclosure. In another embodiment, as shown in FIG. 2, the first dielectric layer 31 is provided in the first region Q1 and not provided in the second region Q2, that is, A>0 and B=0, that is, the thickness of the first dielectric layer 31 in the second region Q2 is equal to 0. Since the first dielectric layer 31 is not provided in the second region Q2 in FIG. 2, B is not shown in FIG. 2.

As shown in FIG. 1 and FIG. 2, at least a part of the first touch line 21 is located in the first region Q1, and at least a part of the second touch line 22 is located in the second region Q2. In the embodiments of the present disclosure, in the second region Q2, the first touch line 21 is electrically connected to the second touch line 22 by passing the first dielectric layer 31. That is, a position where the first touch line 21 and the second touch line 22 are electrically connected to each other is located in the second region Q2.

The first touch line 21 being electrically connected to the second touch line 22 by passing the first dielectric layer 31 includes the following cases.

In a case, as shown in FIG. 1, a first dielectric layer 31 is provided in the second region Q2, and the first dielectric layer 31 has a first via 310 in the second region Q2. The first via 310 penetrates through the first dielectric layer 31. That is, the first via 310 is located in the second region Q2 and has a depth B1, where B1=B−B2, B2 denoting a thickness of the second touch line 22. The first touch line 21 and the second touch line 22 are electrically connected to each other through the first via 310 located in the second region Q2. When the thickness of the second touch line 22 is constant, the depth B1 of the first via 310 is positively correlated with the thickness B of the first dielectric layer 31.

In another case, as shown in FIG. 2, the first dielectric layer 31 is provided in the first region Q1 and not provided in the second region Q2. After the first touch line 21 extends from the first region Q1 to the second region Q2 along a side surface 30 of the first dielectric layer 31, the first touch line 21 and the second touch line 22 are connected to each other in the second region Q2. The first touch line 21 located in the first region Q1 and the first touch line 21 located in the second region Q2 are located in different planes. The first touch line 21 located in the second region Q2 and the second touch line 22 located in the second region Q2 may be located in a same plane.

In the embodiments of the present disclosure, the first touch line 21 and the second touch line 22 are electrically connected to each other in the second region Q2, the thickness B of the first dielectric layer 31 in the second region Q2 is smaller than the thickness A of the first dielectric layer 31 in the first region Q1, which can reduce a depth of the first via 310 located in the second region Q2 compared with a solution where the first touch line 21 and the second touch line 22 are electrically connected to each other in the first region Q1. As shown in FIG. 1, an area of an upper opening of the first via 310 is large, and an area of a lower opening of the first via 30 is small. The upper opening of the first via 310 is an opening of the first via 310 away from the substrate 1, and the lower opening of the first via 310 is an opening of the first via 310 close to the substrate 1. In order to make the connection between the first touch line 21 and the second touch line 22 reliable, an area of a conductive material filled in the first via 310 should not be too small. Correspondingly, the area of the lower opening of the first via 310 is not too small. When the area of the lower opening of the first via 310 and a slope of the sidewall of the first via 310 are constant, the area of the upper opening of the first via 310 is positively correlated with the depth of the first via 310. Therefore, in this embodiment of the present disclosure, the depth of the first via 310 is reduced, thereby reducing the area of the upper opening of the first via 310, and thus reducing an area occupied by the first via 310 in the plane of the display panel.

In an embodiment of the present disclosure an embodiment, as shown in FIG. 2, the first touch line 21 and the second touch line 22 may be directly connected to each other in the second region Q2. With such configuration, the first touch line 21 and the second touch line 22 are connected to each other without a via, therefore, there is no need to provide a via connecting the first touch line 21 with the second touch line 22, thereby reducing an area of the region where the first touch line 21 and the second touch line 22 are connected to each other in the plane of the display panel.

Exemplarily, in an embodiment of the present disclosure, the first dielectric layer 31 may include a first organic layer 311, and a thickness C of the first organic layer 311 in the first region Q1 and a thickness D of the first organic layer 311 in the second region Q2 satisfy C>D≥0, where C≤A and D≤B.

FIG. 1 and FIG. 2 illustrate that the first dielectric layer 31 includes only the first organic layer 311, where C=A and D=B. As shown in FIG. 1, the first via 310 penetrates through the first organic layer 311. As shown in FIG. 2, the first organic layer is not provided in the second region Q2, that is, D=B=0, so B and D are not shown in FIG. 2.

Compared with an inorganic layer, an organic layer provided in the display panel generally has a relatively large thickness. Therefore, when a via is formed in the organic layer, an area occupied by the via will also be relatively large. In this embodiment of the present disclosure, the thickness D of the first organic layer 311 in the second region Q2 is smaller than the thickness C of the first organic layer 311 in the first region Q1, that is, the first organic layer 311 has different thicknesses in the first region Q1 and in the second region Q2, and the first via 310 is provided in the second region Q2 where the first organic layer 311 is relatively thin, so that an area occupied by the first via 310 can be reduced.

Figure 3:
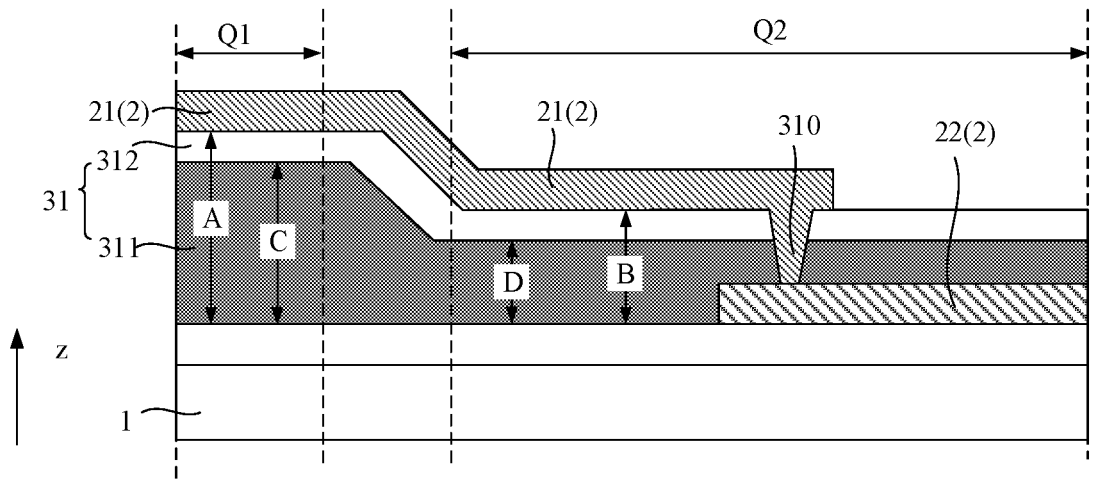
FIG. 3 is a cross-sectional view of a partial region of a display panel provided by another embodiment of the present disclosure.
Figure 4:
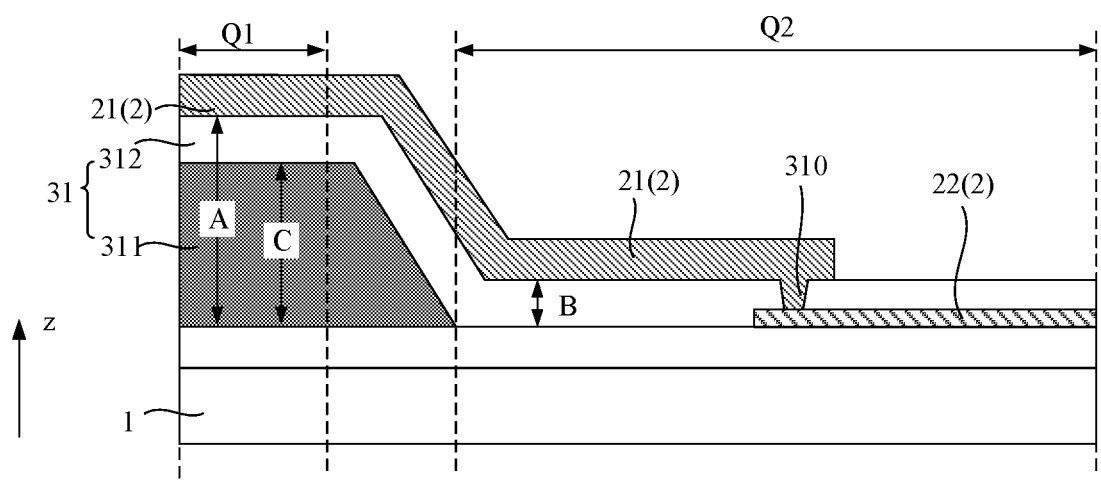
FIG. 4 is a cross-sectional view of a partial region of a display panel provided by another embodiment of the present disclosure.

FIG. 3 and FIG. 4 are cross-sectional views of partial regions of two another display panels provided by embodiments of the present disclosure. As shown in FIG. 3 and FIG. 4, the first dielectric layer 31 includes a first organic layer 311 and a first inorganic layer 312.

In an embodiment, as shown in FIG. 3 and FIG. 4, the first inorganic layer 312 may be provided in both the first region Q1 and the second region Q2.

In the first region Q1, as shown in FIG. 3 and FIG. 4, when a first organic layer 311 with a thickness of C is provided in the first region Q1, the first inorganic layer 312 is located between the first organic layer 311 and the first touch line 21, where C<A.

As shown in FIG. 3, when the first organic layer 311 with a thickness of D is provided in the second region Q2, at least a part of the first inorganic layer 312 in the second region Q2 is located between the first organic layer 311 and the first touch line 21, where D<B. The second touch line 22 is located on a side of the first organic layer 311 close to the substrate 1. The first via 310 for connecting the first touch line 21 with the second touch line 22 penetrates through the first organic layer 311 and the first inorganic layer 312.

Exemplarily, as shown in FIG. 3, a thickness of the first inorganic layer 312 is smaller than the thickness of the first organic layer 311. Since an internal stress of the inorganic layer is usually relatively large, a possibility of cracking of the first inorganic layer 312 under stress can be reduced by designing the thickness of the first inorganic layer 312 to be relatively small.

As shown in FIG. 4, the thickness of the first organic layer 311 in the second region Q2 is 0, that is, when the first organic layer 311 is not provided in the second region Q2, in the second region Q2, the first inorganic layer 312 is located on a side of the second touch line 22 away from the substrate 1, and at least part of the first touch line 21 is located on a side of the first inorganic layer 312 away from the substrate 1. The first via 310 for connecting the first touch line 21 with the second touch line 22 penetrates through the first inorganic layer 312.

As shown in FIG. 4, in an embodiment of the present disclosure, in addition to the first via 310 formed in the second region Q2, a first inorganic layer 312 is further provided, and at least a part of the first inorganic layer 312 surrounds the first via 310 to form a part of a sidewall of the first via 310.

Figure 5:
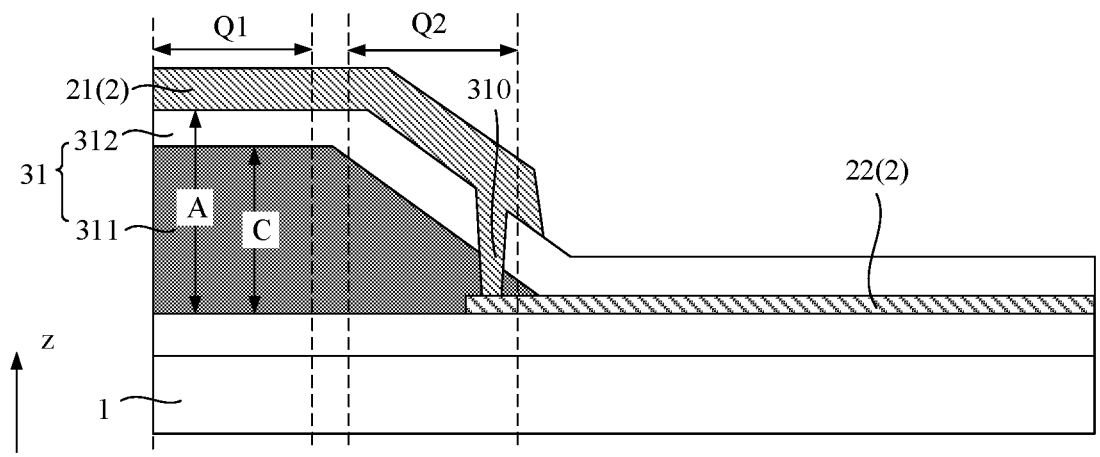
FIG. 5 is a cross-sectional view of a partial region of a display panel provided by another embodiment of the present disclosure.

When the first organic layer 311 is provided in the second region Q2, the thickness of the first organic layer 311 in the second region Q2 may not be uniform at different positions. FIG. 5 is a cross-sectional view of a partial region of a display panel provided by another embodiment of the present disclosure. Exemplarily, as shown in FIG. 5, the thickness of the first organic layer 311 gradually decreases along a direction from the first region Q1 to the second region Q2. The first via 310 penetrates through at least the first organic layer 311 in the second region Q2. As shown in FIG. 5, when the first inorganic layer 312 is provided in the second region Q2, the first via 310 penetrates through the first organic layer 311 and the first inorganic layer 312. The first touch line 21 is electrically connected to the second touch line 22 through the first via 310 formed in the first dielectric layer 31.

In the embodiments of the present disclosure, the first organic layer 311 not only insulates the metal layers located on both sides of the first organic layer 311 from each other, but also has a better surface flatness compared with the inorganic layer. Therefore, the first organic layer 311 can also provide a relatively flat carrier surface for a subsequent layer that is formed after the first organic layer 311, which is convenient for formation of the subsequent layer. For example, in an embodiment of the present disclosure, the first organic layer 311 can be provided in at least the display region, and the first organic layer 311 is located on a side of the light-emitting units close to the substrate. That is, the first organic layer 311 provides a flat surface, and the first organic layer 311 is used as the carrier substrate for the light-emitting units. A specific configuration of the first organic layer 311 and the light-emitting units will be described in detail below, and will not be described in this paragraph.

The organic layer is relatively soft, therefore, for a region of the display panel that has a low requirement on flatness and a high requirement on hardness, such as a region of the display panel that needs to perform a lamination process (for example, a region of the display panel where a driving chip is bonded), in order to avoid a large degree of deformation of the layer under an external force, an organic layer is usually not provided in this region, so that an overall hardness of the layer in this region can be improved. Therefore, in an embodiment of the present disclosure, the second region Q2 where the first via 310 is located can be reused as a region of the display panel where the first organic layer 311 is relatively thin or a region of the display panel where the first organic layer 311 is not provided. In this way, there is no need to add a new space in the display panel as the space for forming the first via 310, and the original layer of the display panel can be fully utilized.

In some embodiments of the present disclosure, the first touch line and the second touch line can be arranged in the layers of the display panel in many ways. For example, in the touch display panel, the display panel includes a touch layer that is configured to achieve a touch function and where the touch electrodes are located, and a display layer that is configured to achieve a display function and where the pixel units are located. Exemplarily, the first touch line may be located in the touch layer of the display panel, and the second touch line may be located in the display layer of the display panel.

The solutions provided by the embodiments of the present disclosure will be described in detail below with reference to the accompanying drawings.

Figure 6:
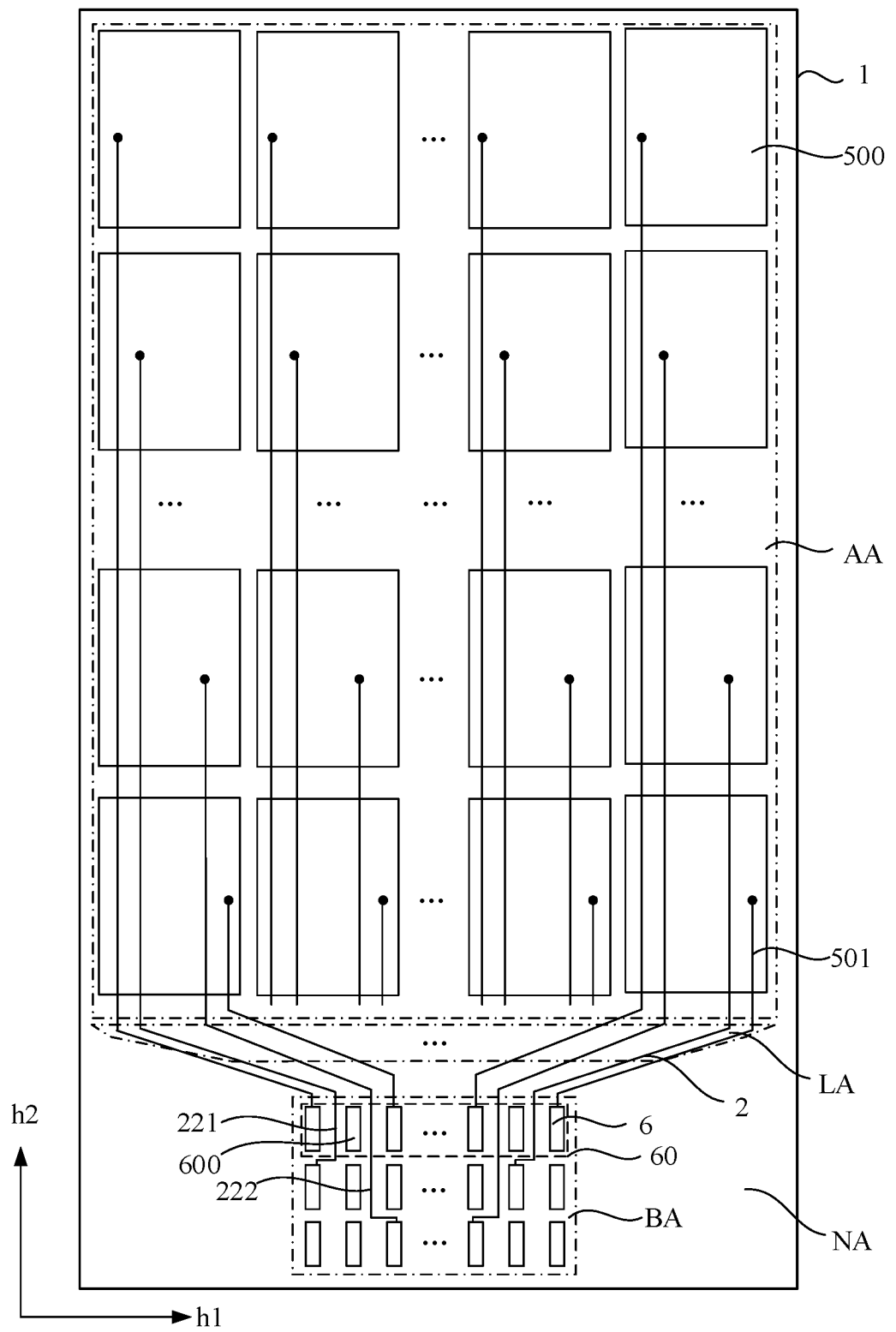
FIG. 6 is a top view of a display panel provided by an embodiment of the present disclosure.
Figure 7:
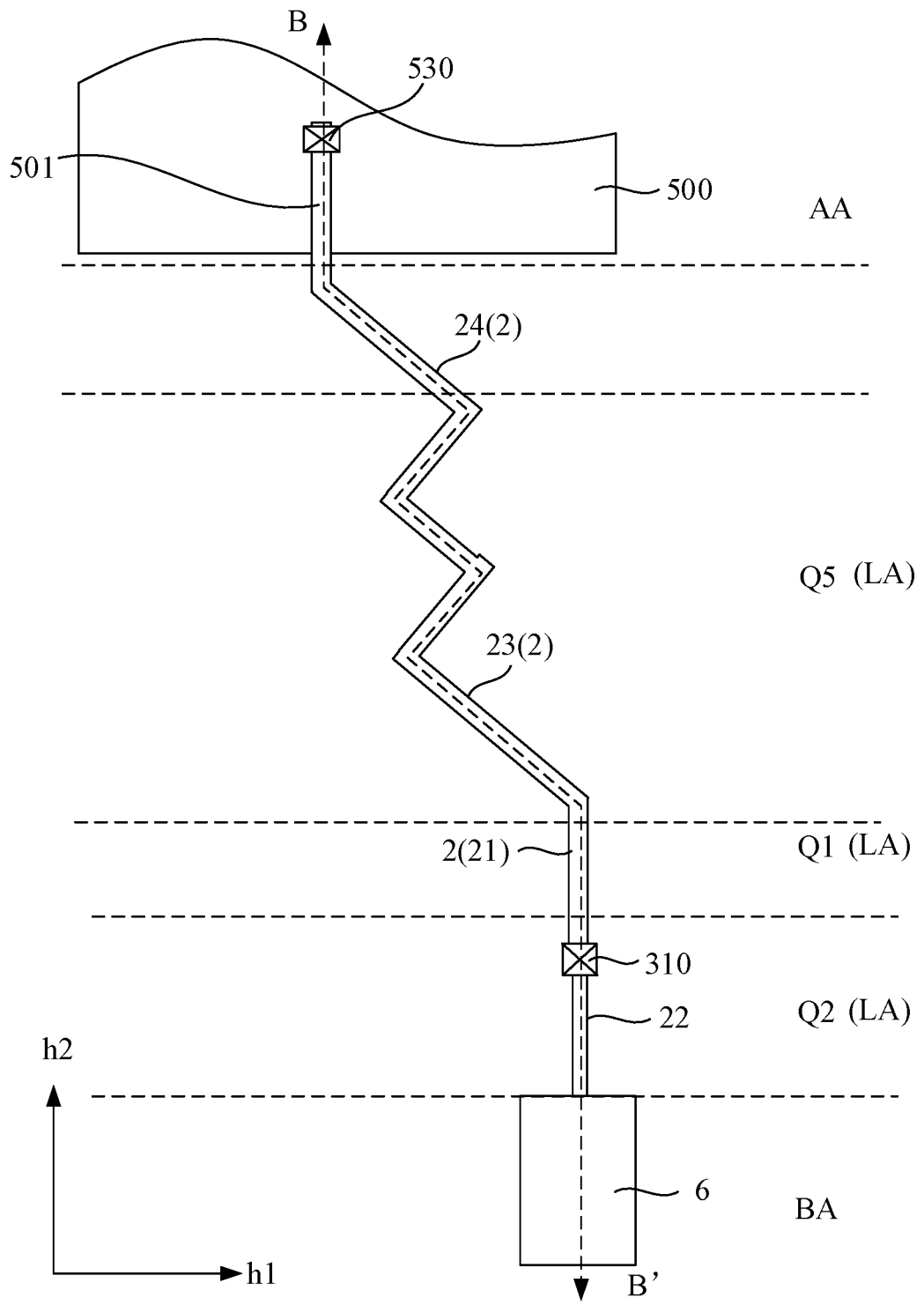
FIG. 7 is a top view illustrating that a touch electrode, a touch signal line, a touch line, and a touch bonding pad are connected to each other provided by an embodiment of the present disclosure.
Figure 8:
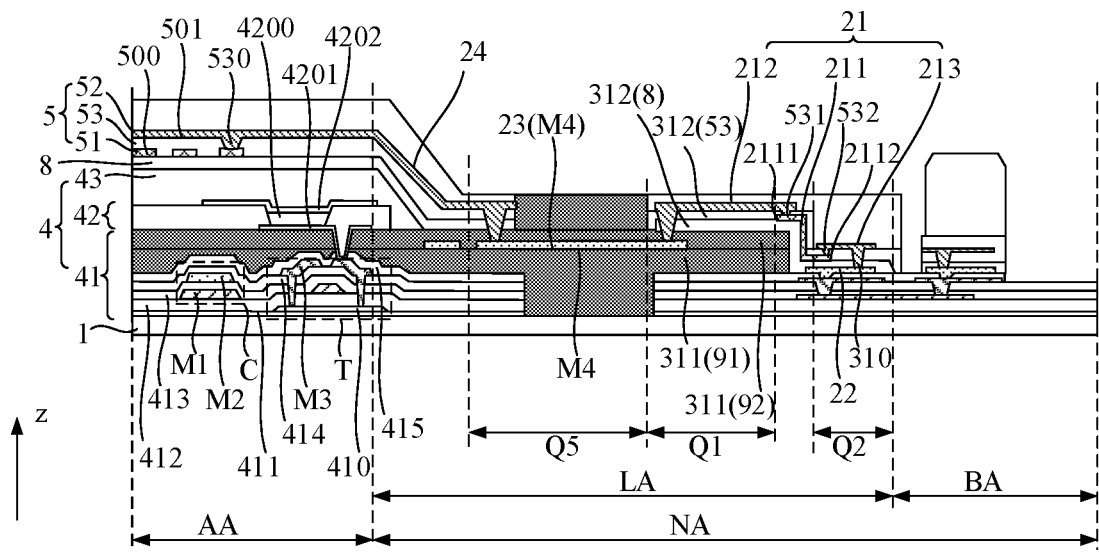
FIG. 8 is a cross-sectional view along BB' shown in FIG. 7.
Figure 9:
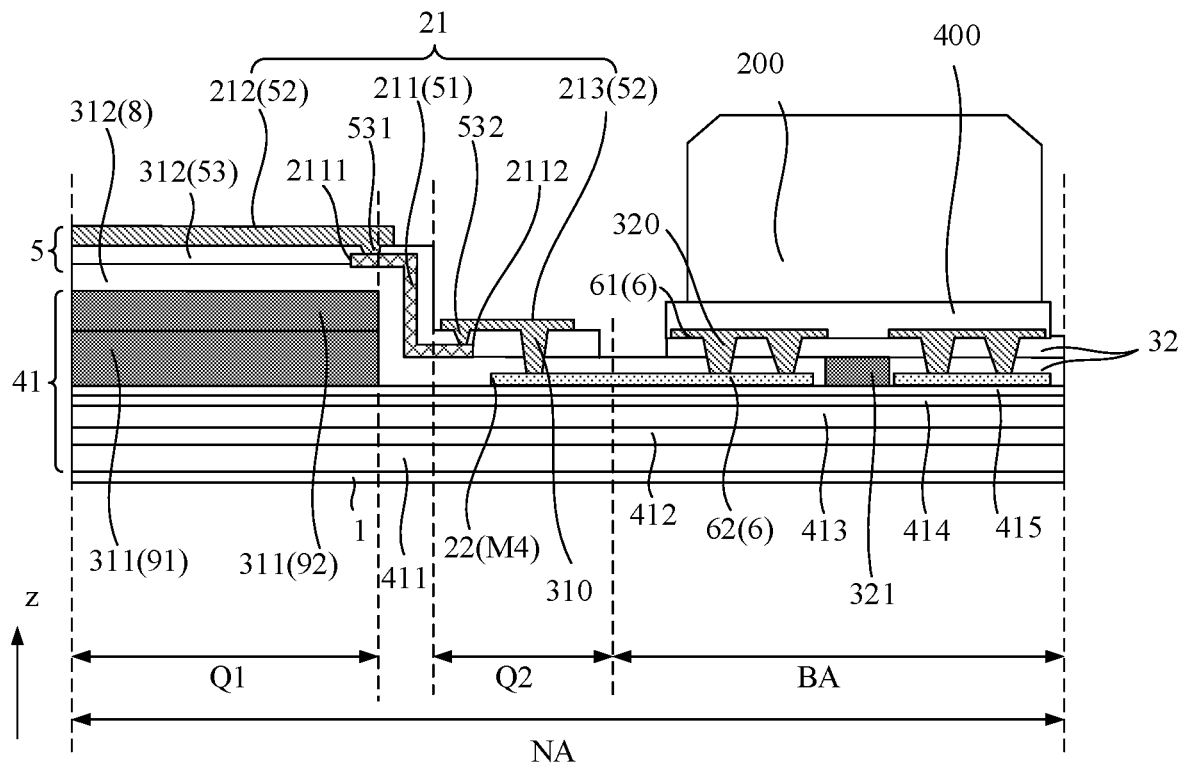
FIG. 9 is an enlarged schematic diagram of a non-display region shown in FIG. 8.

FIG. 6 is a top view of a display panel provided by an embodiment of the present disclosure, and FIG. 7 is a top view illustrating that a touch electrode, a touch signal line, a touch line, and a touch bonding pad are connected to each other provided by an embodiment of the present disclosure. FIG. 8 is a cross-sectional view along BB' shown in FIG. 7, and FIG. 9 is an enlarged schematic diagram of a non-display region shown in FIG. 8. As shown in FIG. 6, FIG. 7, FIG. 8, and FIG. 9, the display panel can include a substrate 1, a display layer 4, and a touch layer 5. The touch layer 5 is located on a side of the display layer 4 facing away from the substrate 1. The display layer 4 is formed with pixel units and is configured to display images. The touch layer 5 is formed with touch electrodes and is configured to achieve touch operation.

The pixel unit includes a plurality of sub-pixels emitting light of different colors. The sub-pixel includes a light-emitting unit and a pixel driving circuit that are electrically connected to each other. As shown in FIG. 8, the display layer 4 may include a driving layer 41 and a light-emitting layer 42. The light-emitting layer 42 is located on a side of the driving layer 41 facing away from the substrate 1. A plurality of light-emitting units are formed in the light-emitting layer 42. The light-emitting unit includes a first electrode 4201, a light-emitting material layer 4200, and a second electrode 4202. Along the direction z perpendicular to the plane of the display panel, the light-emitting material layer 4200 is located between the first electrode 4201 and the second electrode 4202. In an embodiment, a region of the display panel where the light-emitting unit is provided is the display region AA of the display panel, and a region of the display panel where the light-emitting unit is not provided is the non-display region NA of the display panel.

A pixel driving circuit, a peripheral circuit, and various signal lines including a display signal line are formed in the driving layer 41. The display signal line is electrically connected to the pixel driving circuit. The pixel driving circuit is electrically connected to the light-emitting unit. The pixel driving circuit and the peripheral circuit each includes a thin film transistor T. In FIG. 8, only one thin film transistor T that is electrically connected to the light-emitting unit in the pixel driving circuit is shown as an illustration. Exemplarily, the pixel driving circuit and the display signal line may be arranged in the display region AA. The peripheral circuit may be arranged in the non-display region NA.

In an embodiment of the present disclosure, multiple metal layers are provided in the driving layer 41 to form various structures. As shown in FIG. 8, the driving layer 41 includes a first metal layer M1, a second metal layer M2, a third metal layer M3, and a fourth metal layer M4 that are located on a same side of the substrate 1, the second metal layer M2 is located on a side of the first metal layer M1 facing away from the substrate 1, the third metal layer M3 is located on a side of the second metal layer M2 facing away from the substrate 1, and the fourth metal layer M4 is located on a side of the third metal layer M3 facing away from the substrate 1.

The display signal lines may include a data voltage signal line, a power supply voltage signal line, and a scanning signal line electrically connected to the pixel driving circuit. The power supply voltage signal lines can include a first power supply voltage signal line and a second power supply voltage signal line. The first power supply voltage signal line is configured to provide a PVDD signal to the pixel driving circuit, and the second power supply voltage signal line is configured to provide a PVEE signal to the pixel driving circuit.

Exemplarily, the first metal layer M1 can be used to form a gate of the thin film transistor T and the scan signal line. The third metal layer M3 can be used to form a source and a drain of the thin film transistor, the data signal line, and the first power voltage signal line. In an embodiment of the present disclosure, the pixel driving circuit further includes a storage capacitor C, and two of the first metal layer M1, the second metal layer M2, and the third metal layer M3 can be used to form two electrode plates of the storage capacitor C, respectively. FIG. 8 is a schematic diagram showing that the first metal layer M1 and the second metal layer M2 form two electrode plates of the storage capacitor C, respectively. Except that the third metal layer M3 can be used to form the first power voltage signal line, the fourth metal layer M4 can also be used to form the first power voltage signal line.

In an embodiment of the present disclosure, as shown in FIG. 8, the driving layer 41 further includes a semiconductor layer 410 configured to form a channel of the thin film transistor T. A first driving insulating layer 411 is provided between the semiconductor layer 410 and the substrate 1. A second driving insulating layer 412 is provided between the semiconductor layer 410 and the first metal layer M1. A third driving insulating layer 413 is provided between the first metal layer M1 and the second metal layer M2. A fourth driving insulating layer 414 is provided between the second metal layer M2 and the third metal layer M3. A passivation layer 415 is provided on the side of the third metal layer M3 facing away from the substrate 1.

Exemplarily, the first driving insulating layer 411, the second driving insulating layer 412, the third driving insulating layer 413, the fourth driving insulating layer 414, and the passivation layer 415 may all be inorganic insulating layers.

As shown in FIG. 8, a first planarization layer 91 is provided between the passivation layer 415 and the fourth metal layer M4. A second planarization layer 92 is provided on a side of the fourth metal layer M4 facing away from the substrate 1. The first planarization layer 91 and the second planarization layer 92 each can provide a flat surface, which is convenient for subsequent formation of the light-emitting unit. Exemplarily, as shown in FIG. 8, the first planarization layer 91 and the second planarization layer 92 can extend from the display region AA of the display panel to the non-display region NA of the display panel.

In an embodiment, as shown in FIG. 8, the display layer 4 further includes an encapsulation layer 43 located on a side of the light-emitting layer 42 facing away from the driving layer 41. Exemplarily, the encapsulation layer 43 may be a thin film encapsulation structure in which an inorganic encapsulation layer and an organic encapsulation layer are stacked.

As shown in FIG. 6, FIG. 7, and FIG. 8, a touch electrode 500 and a touch signal line 501 may be formed in the touch layer 5 and located in the display region AA. In an embodiment of the present disclosure, the touch layer 5 may include a first touch conductive layer 51 and a second touch conductive layer 52. One of the first touch conductive layer 51 and the second touch conductive layer 52 is located on a side of the other one of the first touch conductive layer 51 and the second touch conductive layer 52 facing the substrate 1. FIG. 8 is a schematic diagram showing that the first touch conductive layer 51 is located on a side of the second touch conductive layer 52 facing the substrate 1. In an embodiment of the present disclosure, one of the first touch conductive layer 51 and the second touch conductive layer 52 can be used to form the touch electrode 500, and the other one of the first touch conductive layer 51 and the second touch conductive layer 52 can be used to form the touch signal line 501. As shown in FIG. 8, the touch electrode 500 is located in the first touch conductive layer 51, and the touch signal line 501 is located in the second touch conductive layer 52. The touch electrode 500 and the touch signal line 501 are electrically connected to each other through a via 530 located in the touch insulating layer 53. In another embodiment of the present disclosure, the touch electrode 500 may be located in the second touch conductive layer 52, and the touch signal line 501 may be located in the first touch conductive layer 51, which is not limited in the embodiments of the present disclosure.

In an embodiment, as shown in FIG. 6, the display panel can adopt a self-capacitive touch technology, and multiple touch electrodes 500 are arranged in an array in the display panel. The touch electrodes 500 are located in the display region AA. Exemplarily, in an embodiment of the present disclosure, a plurality of openings can be provided in the touch electrodes 500, and the openings and the light-emitting units can overlap in the direction perpendicular to the plane of the display panel. The touch electrode 500 may be made of a material including metal. With such configuration, the resistance of the touch electrode 500 can be reduced, which increases a transmission rate of the touch signal and prevents the touch electrode 500 from affecting light output of the light-emitting unit, thereby improving the display effect of the display panel.

As shown in FIG. 8, a buffer layer 8 can be provided between the display layer 4 and the touch layer 5. With the buffer layer 8, when the touch electrode 500 and/or the touch signal line 501 are formed by etching, if over-etching occurs, the structure in the display layer 4 will not be affected. Exemplarily, the buffer layer 8 can be made of a material including an inorganic material.

Exemplarily, in the display region AA, at least a part of the encapsulation layer 43 can be reused as a buffer layer. For example, when the encapsulation layer 43 is provided as a thin-film encapsulation structure including an inorganic encapsulation layer and an organic encapsulation layer that are stacked on each other, the inorganic encapsulation layer located on a side of the thin-film encapsulation structure facing the touch layer 5 can be reused as the buffer layer, which can reduce a thickness of the layer in the display panel.

As shown in FIG. 6, FIG. 7, and FIG. 8, the non-display region NA includes a line arranging region LA and a bonding region BA, and the bonding region BA is located at a side of the line arranging region LA away from the display region AA. Exemplarily, the bonding region BA and the line arranging region LA are arranged along a second direction h2. The bonding region BA is located at a side of the line arranging region LA away from the display region AA.

The bonding region BA is provided with multiple bonding pads including a touch bonding pad 6 and a display bonding pad. The display bonding pads include a power signal bonding pad and a data bonding pad.

Lines transmitting various signals are provided in the line arranging region LA. For example, the lines include a display line and the touch line 2. The display lines include a power supply voltage line and a data line. The power supply bonding pad is electrically connected to the power supply voltage signal line through the power supply voltage line. The data bonding pad is electrically connected to the data voltage signal line through the data line. The touch bonding pad 6 is electrically connected to the corresponding touch electrode 500 through the touch line 2.

After various layers in the display panel are formed, the display bonding pad and the display chip can be bonded and connected to each other, and the touch bonding pad 6 and the touch chip can be bonded and connected to each other. When the display panel displays images, the display chip provides various display signals to the pixel driving circuit through various display signal lines. When being driven by the various display signals, the pixel driving circuit drives the light-emitting unit to light up for display. When a touch operation is performed on the display panel, a capacitance is generated between the finger and the touch electrode 500 when a finger touches the display panel, and this capacitance is superimposed to a capacitance between the touch electrode 500 and the ground, thereby changing the capacitance between the touch electrode 500 and the ground, and a change value of the capacitance between the touch electrode 500 and the ground can be transmitted to the touch chip through the touch signal line 501 electrically connected to the touch electrode 500. Then the touch chip can determine a touch position according to the change value of the capacitance generated before and after the touch.

In an embodiment of the present disclosure, as shown in FIG. 8, the touch chip and display chip can be integrated and designed into a single integrated chip 200, that is, using touch and display driver integration (TDDI) technology.

As shown in FIG. 8, the first touch line 21 and the second touch line 22 are located in the line arranging region LA, and the first region Q1 and the second region Q2 are also located in the line arranging region LA.

Exemplarily, as shown in FIG. 7 and FIG. 8, the first region Q1 is located at a side of the second region Q2 close to the display region AA.

Besides the first touch line 21 and the second touch line 22 that are located in the line arranging region LA of the display panel, other circuits used to make the display panel realize other functions, such as an electrostatic protection circuit and a test circuit can also be provided in the line arranging region LA according to different design requirements of the display panel. Therefore, a wiring space in the line arranging region LA is relatively tight. In an embodiment of the present disclosure, the position where the first touch line 21 and the second touch line 22 are connected to each other is arranged in the second region Q2, which reduces the area occupied by a position in the line arranging region LA where the first touch line 21 and the second touch line 22 are connected to each other, so that more devices and circuits can be provided in the line arranging region LA. That is, such configuration can avoid increasing the area of the line arranging region LA, and also achieve a required screen-to-body ratio of the display panel while fully utilizing the limited space in the line arranging region LA.

Exemplarily, when providing the touch bonding pads 6 in the bonding region BA, multiple touch bonding pads 6 can be divided into multiple touch bonding pad groups arranged along a second direction h2. As shown in FIG. 6, multiple touch bonding pad groups 60 are arranged along the second direction h2, and each touch bonding pad group 60 includes a plurality of touch bonding pads 6 arranged along the first direction h1. The first direction h1 intersects with the second direction h2. With such configuration, compared with the solution in which all the touch bonding pads 6 in the bonding region BA are arranged in a row along the first direction h1, the bonding region BA has a reduced length in the first direction h1.

Exemplarily, as shown in FIG. 7 and FIG. 8, the second touch line 22 is adjacent to the touch bonding pad 6, and the second touch line 22 is directly connected to the touch bonding pad 6.

As shown in FIG. 8 and FIG. 9, in an embodiment of the present disclosure, the first touch line 21 can be located in the touch layer 5 of the display panel, and the second touch line 22 can be located in the driving layer 41 of the display panel.

As shown in FIG. 6, after the touch bonding pads are divided into multiple touch bonding pad groups 60, for the touch bonding pad group 60 having a relatively large distance from the display region AA, taking FIG. 6 as an example, when the touch bonding pads are divided into three touch bonding pad groups 60, along the direction from the display region AA to the non-display region NA, the second touch line 221 connected to one second touch bonding pad 6 in a second touch bonding pad group 60 needs to pass through a gap formed between two adjacent touch bonding pads 6 in a first touch bonding pad group 60; and the second touch line 221 connected to one second touch bonding pad 6 in a third touch bonding pad group 60 needs to pass through a gap formed between two adjacent touch bonding pads 6 in the first touch bonding pad group 60 and a gap formed between two adjacent touch bonding pads 6 in the second touch bonding pad group 60. In FIG. 6, the touch bonding pad located between the second touch line 221 and the second touch line 222 is marked as 600.

It can be seen from FIG. 8 and FIG. 9 that the display panel provided by this embodiment of the present disclosure includes a buffer layer 8 covering the driving layer 41. Therefore, in an embodiment of the present disclosure, the second touch line 22 is located in the driving layer 41, so that the second touch line 22 is not exposed at a surface layer of a to-be-bonded display panel.

With such configuration, on the one hand, even if there is a deviation in the bonding process, a pin on the integrated chip 200 that should be connected to the touch bonding pad 600 is not connected to the second touch line 221 or the second touch line 222, so that normal transmission of a touch signal can be achieved. On the other hand, when the integrated chip 200 and the touch bonding pad 6 are bonded and connected to each other by a lamination process, under the pressure, a layer located in the bonding region BA and relatively close to the surface layer of the display panel may crack, and a conductive layer under an insulating layer are exposed at the surface of the display panel after the insulating layer on the surface layer cracks. Compared with a solution in which the second touch line 22 is arranged in the touch layer 5, in this embodiment of the present disclosure, when the second touch line 22 is arranged in the driving layer 41, a risk of cracking of the insulating layer located on the driving layer 41 is relatively low, that is, a probability that the second touch line 22 is exposed at the surface layer of the to-be-bonded display panel is low. Therefore, even if the surface layer of the display panel cracks during the lamination process, the pin on the integrated chip 200 that should be connected to the touch bonding pad 600 will not be connected to the second touch line 221 or the second touch line 222, thereby better achieving normal transmission of the touch signal.

Exemplarily, the first organic layer 311 in the first dielectric layer 31 shown in FIG. 1, FIG. 2, FIG. 3, FIG. 4, and FIG. 5 may include at least one of the first planarization layer 91 or the second planarization layer 92 that is shown in in FIG. 8 and FIG. 9.

The first inorganic layer 312 shown in FIG. 3, FIG. 4, and FIG. 5 may include at least one of the buffer layer 8 or the touch insulating layer 53 that is shown in FIG. 8 and FIG. 9.

Exemplarily, as shown in FIG. 9, the second touch line 22 can be located in the fourth metal layer M4, that is, the second touch line 22 and the power voltage signal line in the display panel are located in a same layer and made of a same material. The power supply voltage signal line may be a first power supply voltage signal line that is electrically connected to the pixel driving circuit and configured to provide a PVDD signal to the pixel driving circuit, so that the second touch line 22 and the power supply voltage signal line can be formed with a same patterning process, which simplifies a manufacturing process of the display panel. Compared with the first metal layer M1, the second metal layer M2, and the third metal layer M3, a distance between the fourth metal layer M4 and the touch layer 5 is smaller. Thus, the first touch line 21 is located in the touch layer 5, and the second touch line 22 is located in the fourth metal layer M4, so that a distance between the first touch line 21 and the second touch line 22 along the direction z perpendicular to the plane of the display panel can be reduced. In this way, when forming the first via 310 connecting the first touch line 21 with the second touch line 22, a depth of the first via 310 can be formed relatively small, which, on the one hand, can reduce the difficulty of the manufacturing process of the first via 310, and on the other hand, can reduce a space of the line arranging region LA occupied by the first via 310 and thus increase a screen-to-body ratio of the display panel.

Exemplarily, as shown in FIG. 9, the touch bonding pad 6 includes a first conductive layer 61 and a second conductive layer 62 that are electrically connected to each other, the first conductive layer 61 is located in the touch layer 5, the second conductive layer 62 is located in the driving layer 41, and the second touch line 22 and the second conductive layer 62 are located in a same layer. The second touch line 22 and the second conductive layer 62 are directly connected to each other, that is, the second touch line 22 and the second conductive layer 62 are connected to each other without through a via.

As shown in FIG. 9, the first conductive layer 61 is provided so that the touch bonding pad 6 forms a convex structure relative to a region adjacent to the touch bonding pad 6, which facilitates bounding and connecting to the subsequent integrated chip 200 through the anisotropic conductive glue 400.

Figure 10:
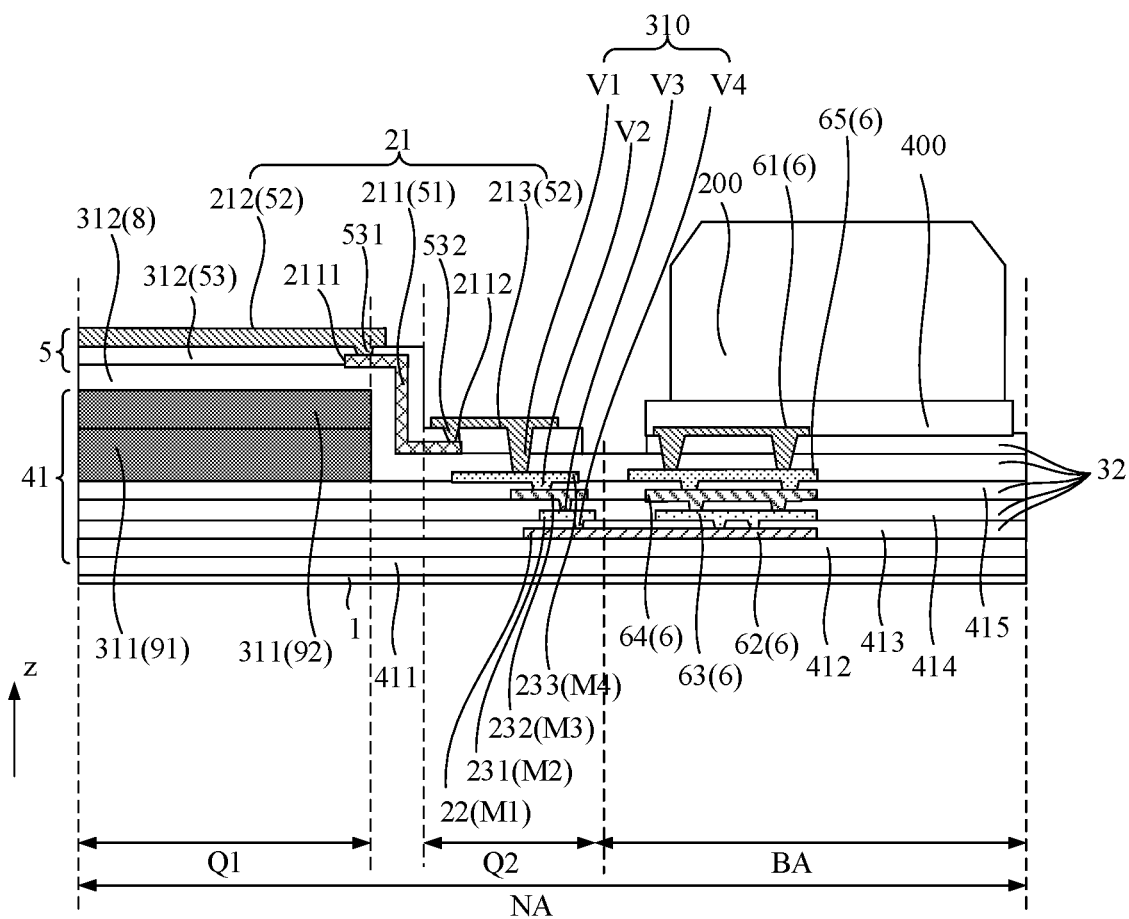
FIG. 10 is an enlarged cross-sectional view of a non-display region of a display panel provided by another embodiment of the present disclosure.

In an embodiment of the present disclosure, the second touch line 22 can be disposed in any one of the first metal layer M1, the second metal layer M2, and the third metal layer M3. FIG. 10 is an enlarged schematic diagram of a non-display region of a display panel provided by another embodiment of the present disclosure. In an embodiment, as shown in FIG. 10, the second touch line 22 is located in the first metal layer M1. In this case, a first intermediate connection line 231, a second intermediate connection line 232, and a third intermediate connection line 233 are provided between the first touch line 21 and the second touch line 22. The first intermediate connection line 231 is located in the second metal layer M2, the second intermediate connection line 232 is located in the third metal layer M3, and the third intermediate connection line 233 is located in the fourth metal layer M4. The first via 310 includes a first sub-via V1 connecting the first touch line 21 with the third intermediate connection line 233, a second sub-via V2 connecting the third intermediate connection line 233 with the second intermediate connection line 232, a third sub-via V3 connecting the second intermediate connection line 232 with the first intermediate connection line 231, and a fourth sub-via V4 connecting the first intermediate connection line 231 with the second touch line 22. The first intermediate connection line 231, the second intermediate connection line 232, and the third intermediate connection line 233 are respectively located in any one or more layers of the second metal layer M2, the third metal layer M3, and the fourth metal layer M4. With such configuration, a risk of the second touch line 22 being exposed at the surface layer of the to-be bond display panel to can be reduced, thereby achieving accurate transmission of the touch signal of the display panel.

Exemplarily, as shown in FIG. 10, the touch bonding pad 6 further includes a third conductive layer 63, a fourth conductive layer 64, and a fifth conductive layer 65 that are located between the first conductive layer 61 and the second conductive layer 62. The third conductive layer 63 is electrically connected to both the second conductive layer 62 and the fourth conductive layer 64. The fifth conductive layer 65 is electrically connected to both the first conductive layer 61 and the fourth conductive layer 64. Exemplarily, the third conductive layer 63, the fourth conductive layer 64, and the fifth conductive layer 65 can be arranged in the same layers as existing layers located in the display region AA, respectively. For example, the third conductive layer 63 can be located in the second metal layer M2, the fourth conductive layer 64 can be located in the third metal layer M3, and the fifth conductive layer 65 can be located in the fourth metal layer M4.

Exemplarily, as shown in FIG. 9, the display panel further includes a second dielectric layer 32 located between the first conductive layer 61 and the second conductive layer 62 along the direction perpendicular to the plane of the display panel, and the second dielectric layer 32 is an inorganic insulating layer. In this embodiment of the present disclosure, an organic layer is not arranged at a position corresponding to the touch bonding pad in the bonding region BA, then in a subsequent high-temperature lamination process, the stability of the layer at a position corresponding to the touch bonding pad can be improved, thereby avoiding deformation.

Exemplarily, the second dielectric layer 32 can include multiple sub-layers that are stacked.

As shown in FIG. 9, the second dielectric layer 32 can include two sub-layers that are stacked, one of the two sub-layers is arranged in the same layer as the buffer layer 8, and the other one of the two sub-layers is arranged in the same layer as the touch insulating layer 53.

In an embodiment, as shown in FIG. 10, the second dielectric layer 32 can include five sub-layers that are stacked, and the five sub-layers are located in the same layers as the buffer layer 8, the touch insulating layer 53, the passivation layer 415, the third driving insulating layer 413, and the second driving insulating layer 412, respectively.

As shown in FIG. 9, the second dielectric layer 32 can include a via 320, and the first conductive layer 61 and the second conductive layer 62 are electrically connected to each other through the via 320. In an embodiment of the present disclosure, the second dielectric layer 32 can include one or more vias 320.

As shown in FIG. 10, the first dielectric layer includes a first organic layer 311 and a first inorganic layer 312. The first organic layer 311 is not provided in the second region Q2, that is, when the thickness of the first organic layer in the second region Q2 is equal to zero, the first touch line 21 includes the first touch sub-line 211. The first touch sub-line 211 has a first end 2111 located in the first region Q1 and overlapping with the first organic layer 311, and a second end 2112 located in the second region Q2 and not overlapping with the first organic layer 311. The first end 2111 and the second end 2112 are arranged along an extending direction of the first touch sub-line 211. The first touch sub-line 211 can be illustrated as a part of the first touch line 21 that extends from the first region Q1 where the first organic layer 311 is provided to the second region Q2 where the first organic layer 311 is not provided. As shown in FIG. 10, along the direction z perpendicular to the plane of the display panel, a distance between the first end 2111 of the first touch sub-line 211 and the substrate 1 is greater than a distance between the second end 2112 of the first touch sub-line 211 and the substrate 1.

As shown in FIG. 10, the first touch line 21 can further include a second touch sub-line 212 and a third touch sub-line 213, the second touch sub-line 212 is located at a side of the first touch sub-line 211 close to the display region AA, and the third touch sub-line 213 is located at a side of the first touch sub-line 211 close to the bonding region BA. The second touch sub-line 212 is electrically connected to the third touch sub-line 213 through the first touch sub-line 211. The third touch sub-line 213 is electrically connected to the second touch line 22, and the second touch sub-line 212 is electrically connected to the touch electrode 500.

Exemplarily, the second touch sub-line 212 can be located in the first region Q1, and the third touch sub-line 213 can be located in the second region Q2. Along the direction z perpendicular to the plane of the display panel, the second touch sub-line 212 overlaps with the first organic layer 311, and the third touch sub-line 313 does not overlap with the first organic layer 311.

When a plurality of touch electrodes 500 are provided in the display region AA, a plurality of touch lines 2 is provided in the display panel correspondingly. In an embodiment of the present disclosure, two adjacent first touch sub-lines 211 are arranged in different layers, that is, during the manufacturing process of the display panel, the two adjacent first touch sub-lines 211 are sequentially formed, rather than being formed synchronously, and the two adjacent first touch sub-lines 211 are separated from each other by an insulating layer. Compared with a solution in which two adjacent first touch sub-lines 211 are arranged in a same layer, in this embodiment of the present disclosure, two adjacent first touch sub-lines 211 are arranged in different layers, so that a possibility of a short circuit between the two adjacent first touch sub-lines 211 can be reduced. When forming the display panel, the first organic layer 311 is formed first, and then the first touch sub-line 211 is formed. That is, the first organic layer 311 can be regarded as a carrier layer that carries the first touch sub-line 211. As mentioned above, the first touch sub-line 211 extends from the first region Q1 of the display panel where the first organic layer 311 is provided to the second region Q2 where the first organic layer 311 is not provided, that is, a surface of the first organic layer 311 overlapping with the first touch sub-lines 211 is a non-planar structure. If the carrier layer that carries the first touch line 21 has a poor flatness, etching residues may be easily produced after the first touch sub-line 211 is formed by etching, thereby causing a short circuit between the two adjacent first touch sub-lines 211. In this embodiment of the present disclosure, two adjacent first touch sub-lines 211 are arranged in different layers, so that a risk of short circuit caused by poor etching can be reduced.

Figure 11:
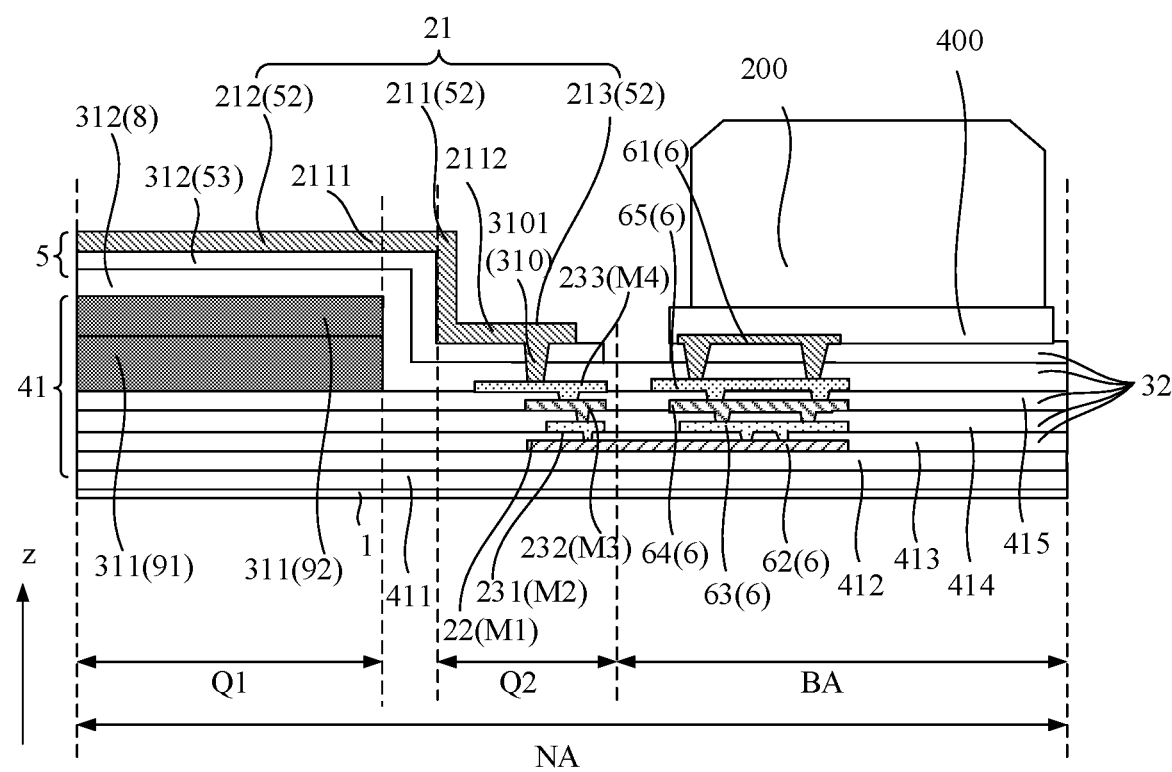
FIG. 11 is an enlarged cross-sectional view of a non-display region of a display panel provided by another embodiment of the present disclosure.

Exemplarily, when arranging two adjacent first touch sub-lines 211, as shown in FIG. 10, in an embodiment of the present disclosure, one of the two adjacent first touch sub-lines 211 can be provided in the first touch conductive layer 51. FIG. 11 is an enlarged schematic diagram of a non-display region of a display panel provided by another embodiment of the present disclosure. In an embodiment of the present disclosure, as shown in FIG. 11, the other one of the two adjacent first touch sub-lines 211 can be provided in the second touch conductive layer 52. In the following, it is defined that the first touch line 21 with the first touch sub-line 211 being located in the first touch conductive layer 51 is a first type of touch line, and the first touch line 21 with the first touch sub-line 211 being located in the second touch conductive layer 52 is a second type of touch line. With such configuration, two adjacent first touch sub-lines are arranged in existing layers of the display panel, respectively, and thus no new layer is further needed for the display panel, which, on the one hand, can reduce the thickness of the display panel, and on the other hand, can simplify the manufacturing process of the display panel.

Figure 12:
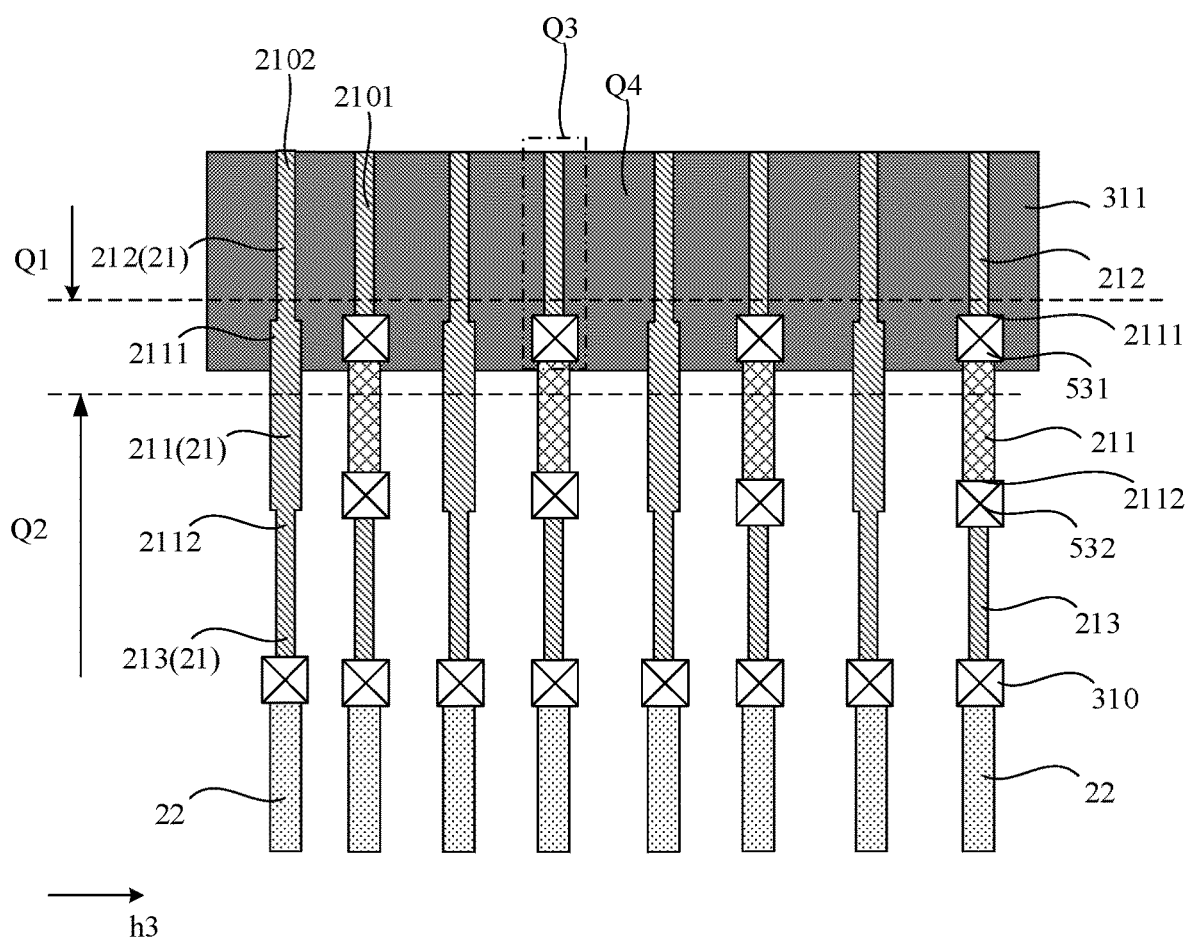
FIG. 12 is a top view of a non-display region of a display panel provided by an embodiment of the present disclosure.

When a plurality of first touch lines 21 is provided in the first region Q1, in an embodiment of the present disclosure, the plurality of first touch lines 21 can be divided into a first type of touch line 2101 and a second type of touch line 2102. Exemplarily, as shown in FIG. 12, which is a top view of a non-display region of a display panel provided by an embodiment of the present disclosure, the first type of touch lines 2101 and the second type of touch lines 2102 are alternately arranged in a direction parallel to the plane of the substrate. Exemplarily, as shown in FIG. 12, the first type of touch line 2101 and the second type of touch line 2102 are arranged along a third direction h3. One second type of touch line 2102 is provided between any two adjacent first type of touch lines 2101, and one first type of touch line 2101 is provided between any two adjacent second type of touch lines 2102.

When arranging the second type of touch line, as shown in FIG. 11, in an embodiment of the present disclosure, the second touch sub-line 212, the third touch sub-line 213, and the first touch sub-line 211 all located in the first touch conductive layer 51, that is, the second touch sub-line 212, the third touch sub-line 213, and the first touch sub-line 211 are arranged in a same layer. With such configuration, the first touch sub-line 211 and the second touch sub-line 212 can be directly connected to each other without through a via, and the second touch sub-line 212 and the third touch sub-line 213 can be directly connected to each other without through a via. As shown in FIG. 11, when the second touch sub-line 212, the third touch sub-line 213 and the first touch sub-line 211 are arranged in a same layer, they are formed in a same process, that is, there may be no boundary between the first end 2111 of the first touch sub-line 211 and the second touch sub-line 212, that is, the first end 2111 and the second touch sub-line 212 are formed into one piece; and there may also be no boundary between the second end 2112 and the third touch sub-line 213, that is, the second end 2112 and the third touch sub-line 213 are formed into one piece.

When arranging the first type of touch line, in an embodiment of the present disclosure, the second touch sub-line 212 and the third touch sub-line 213 can be arranged in a same layer. Exemplarily, as shown in FIG. 10, in an embodiment of the present disclosure, the second touch sub-line 212 and the third touch sub-line 213 can be located in the second touch conductive layer 52, and the first touch sub-line 211 can be located in the first touch conductive layer 51.

As shown in FIG. 10, the touch insulating layer 53 includes a second via 531 and a third via 532. The second touch sub-line 212 is electrically connected to the first touch sub-line 211 through the second via 531, and the third touch sub-line 213 is electrically connected to the first touch sub-line 211 through the third via 532.

In an embodiment of the present disclosure, the second touch lines 22 of the first type of touch line and the second type of touch line can be located in a same layer. FIG. 10 and FIG. 11 are schematic diagrams showing that the second touch lines 22 of the first type of touch line and the second type of touch line are located in the first metal layer M1. In the first type of touch line, in an embodiment of the present disclosure, the third touch sub-line 213 is also disposed in the second touch conductive layer 52, which can simplify the manufacturing process of the first type of touch line 2101 and the second type of touch line 2102.

With reference to FIG. 11, when manufacturing the second type of touch line, the second touch line 22 is formed first, and then the first intermediate connection line 231, the second intermediate connection line 232, and the third intermediate connection line 233 are sequentially formed. The first intermediate connection line 231 is electrically connected to the second touch line 22, the second intermediate connection line 232 is electrically connected to the first intermediate connection line 231, and the third intermediate connection line 233 is electrically connected to the second intermediate connection line 232. After the third intermediate connection line 233 located in the fourth metal layer M4 is formed, the buffer layer 8 and the touch insulating layer 53 are sequentially formed. Then a first sub-via 3101 penetrating through the buffer layer 8 and the touch insulating layer 53 is formed, and then the first touch line 21 is formed. The first touch line 21 is electrically connected to the third intermediate connection line 233 through the first sub-via 3101. So far, the manufacturing process of the second type of touch line is completed.

When forming the first type of touch line with the structure shown in FIG. 10, in the same way, the second touch line 22 is formed first, and then the first intermediate connection line 231, the second intermediate connection line 232, and the third intermediate connection line 233 are sequentially formed. The first intermediate connection line 231 is electrically connected to the second touch line 22, the second intermediate connection line 232 is electrically connected to the first intermediate connection line 231, and the third intermediate connection line 233 is electrically connected to the second intermediate connection line 232. After the third intermediate connection line 233 located in the fourth metal layer M4 is formed, the buffer layer 8 and the first touch sub-line 211 are sequentially formed. The first touch sub-line 211 can be formed in the same process as the touch electrode or the touch signal line located in the display region AA. After the first touch sub-line 211 is formed, the touch insulating layer 53 having the second via 531 and the third via 532 is formed. The touch insulating layer 53 having the second via 531 and the third via 532 can also be formed simultaneously with the via 530 in the display region AA that connects the touch signal line with the touch electrode. Then a first sub-via 3101 penetrating through the buffer layer 8 and the touch insulating layer 53 is formed, and then a first touch line 21 is formed. The first touch line 21 is electrically connected to the third intermediate connection line 233 through the first sub-via 3101. So far, manufacturing process of the first type of touch line is completed. Comparing FIG. 10 with FIG. 11, it can be seen that the first sub-via 3101 in the first type of touch line and the first sub-via 3101 in the second type of touch line can be formed simultaneously.

Figure 13:
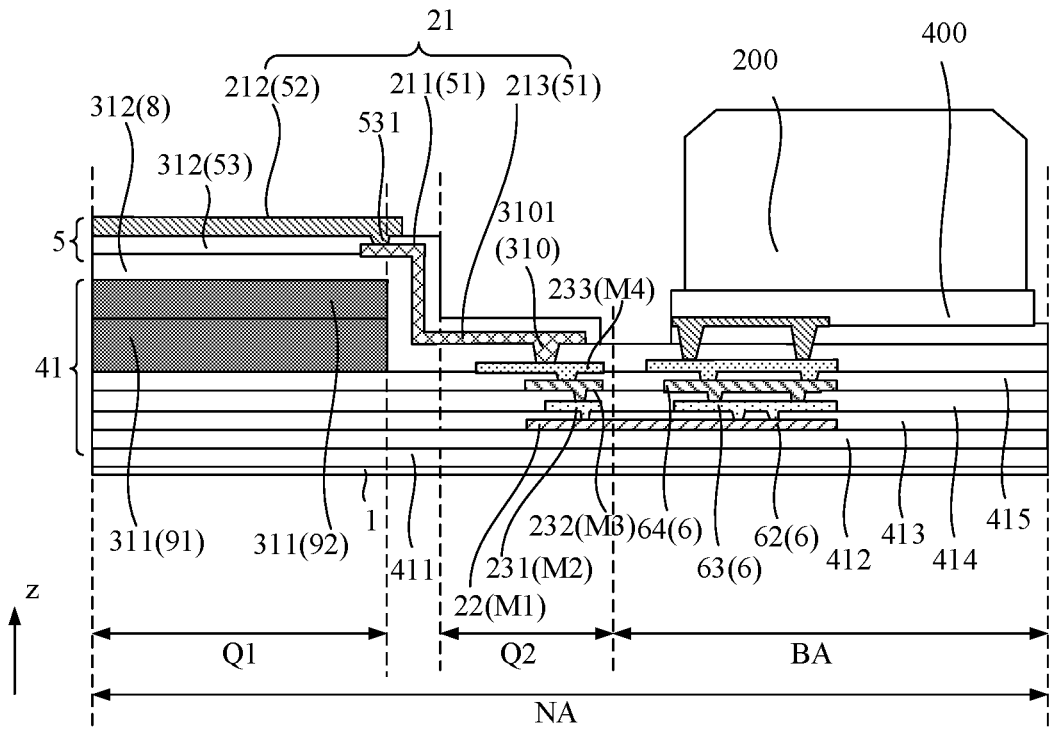
FIG. 13 is an enlarged cross-sectional view of a non-display region of a display panel according to an embodiment of the present disclosure.

FIG. 13 is an enlarged cross-sectional view of a non-display region of a display panel provided by an embodiment of the present disclosure. If the first type of touch line is designed to have the structure shown in FIG. 13, the third touch sub-line 213 is provided in the first touch conductive layer 51. The first sub-via connecting the third touch sub-line 213 with the third intermediate connection line 233 penetrates through the buffer layer 8. Since there is no need to provide a via in the display region AA that penetrates through the buffer layer 8, there is one less process in a solution as shown FIG. 10 compared with a solution as shown in FIG. 13, thereby improving the process efficiency.

When the first dielectric layer 31 includes the first organic layer 311, with reference to FIG. 12, the first organic layer 311 has a third region Q3 and a fourth region Q4. An orthographic projection of the first touch line 21 on a plane of the first organic layer 311 is located in the third region Q3, and the first touch line 21 does not overlap with the fourth region Q4; that is, the first touch line 21 is not located in the fourth region Q4. When the display region includes a plurality of touch electrodes, correspondingly, a plurality of touch lines is provided in the display panel. Correspondingly, there are a plurality of third regions Q3 and a plurality of fourth regions Q4. As shown in FIG. 12, the plurality of third regions Q3 and the plurality of fourth regions Q4 are alternately arranged along the third direction h3.

Figure 14:
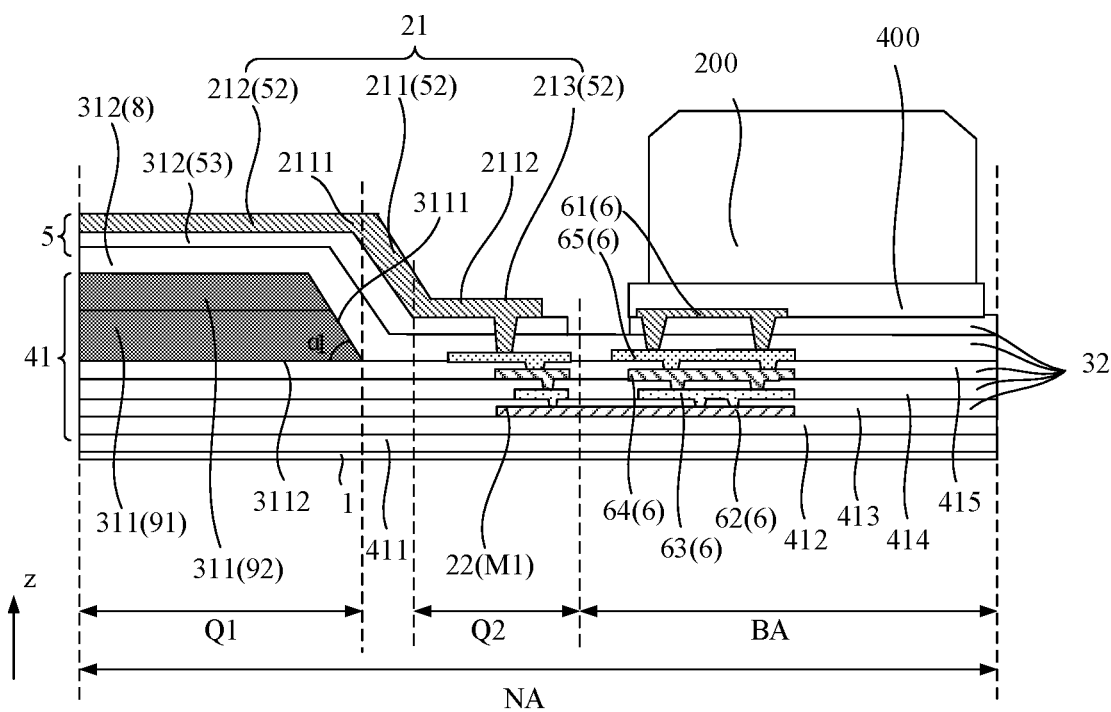
FIG. 14 is an enlarged cross-sectional view of a third region of a display panel provided by an embodiment of the present disclosure.

FIG. 14 is an enlarged cross-sectional view of a third region of a display panel provided by an embodiment of the present disclosure. In an embodiment, as shown in FIG. 14, the first organic layer 311 includes a first side surface 3111 and a bottom surface 3112, the first side surface 3111 is a surface of the first organic layer 311 close to the bonding region BA, and the bottom surface 3112 is a surface of the first organic layer 311 close to the substrate 1; and in the third region Q3, a first angle α1 is formed between the first side surface 3111 of the first organic layer 311 and the bottom surface 3112 of the first organic layer 311.

Figure 15:
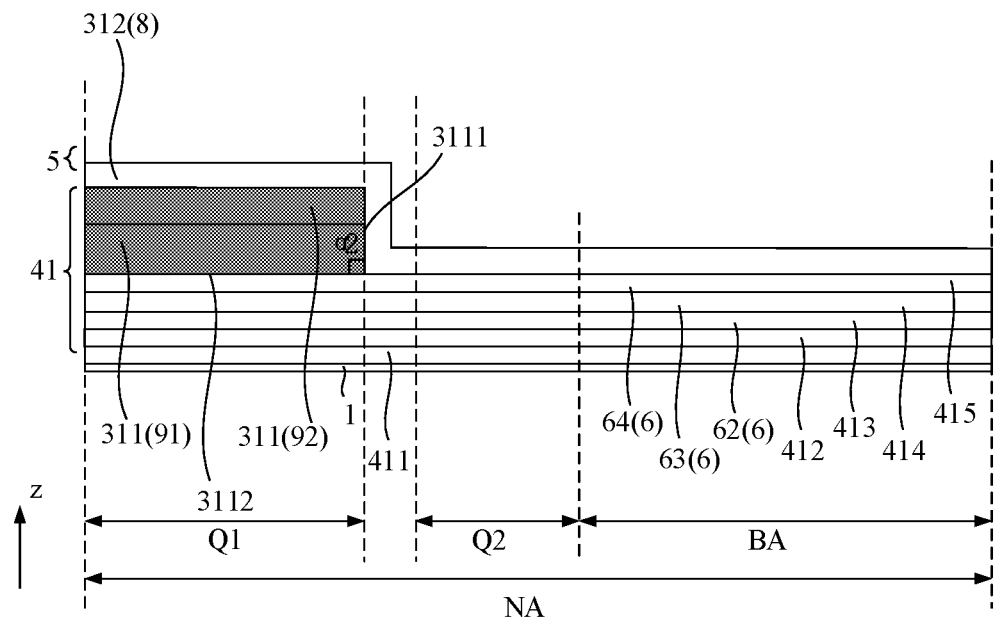
FIG. 15 is an enlarged cross-sectional view of a fourth region of a display panel provided by an embodiment of the present disclosure.

FIG. 15 is an enlarged cross-sectional view of a fourth region of a display panel provided by an embodiment of the present disclosure. As shown in FIG. 15, in the fourth region Q4, a second Angle α2 is formed between the first side surface 3111 and the bottom surface 3112 of the first organic layer 311. In an embodiment of the present disclosure, 0<α1<α2≤90°.

As mentioned above, when manufacturing the display panel, the first organic layer 311 can be regarded as a carrier layer for carrying the first touch lines 21. In an embodiment of the present disclosure, the angle formed between the first side surface 3111 and the bottom surface 3112 of the first organic layer 311 in the third region Q3 is relatively small, which can make the thickness of the first organic layer 311 change more smoothly. In this way, when forming the first touch lines 21 by etching, a possibility of etching residues can be reduced, so that a risk of short circuit between two adjacent first touch lines 21 can be reduced, and the reliability of the display panel can be improved.

Exemplarily, in an embodiment of the present disclosure, the first angle α1 satisfies: 0<α1≤60°.

FIG. 14 exemplarily illustrates that the first touch sub-line 211, the second touch sub-line 212, and the third touch sub-line 213 are arranged in a same layer, and two adjacent first touch sub-lines 211 can also be arranged in different layers when the first angle α1 is relatively small.

Exemplarily, as shown in FIG. 7 and FIG. 8, the non-display region NA further includes a bending region Q5 located at a side of the first region Q1 close to the display region AA, and the third touch line 23 electrically connected to the first control line 21 is provided in the bending region Q5 and located in the driving layer 41.

In this embodiment of the present disclosure, with the bending region Q5, the first region Q1, the second region Q2, and the bonding region BA can be bent to a backlight side of the display panel by means of the bending region Q5, which is beneficial to increase of the screen-to-body ratio of the display panel.

In an embodiment of the present disclosure, only a bending metal layer W1 and an organic insulating layer are provided in the bending region Q5, the third touch line 23 is located in the bending metal layer, and the bending metal layer is located in the driving layer 41. The organic insulating layer includes at least one of the first planarization layer 91 or the second planarization layer 92. That is, no inorganic layer is provided in the bending region Q5, thereby improving bendability of the bending region Q5. The bending metal layer is located at a neutral plane or a position close to the neutral plane. The neutral plane is a layer that receives the least stress during the bending process of all layers in the bending region. The neutral plane can be determined according to a thickness and modulus of each layer located in the bending region.

Exemplarily, the bending region Q5 has a bending axis. In the bending region Q5, a non-right angle is formed between the third touch line 23 and the bending axis. As shown in FIG. 7, in an example, an extension direction of the bending axis is parallel to the first direction h1, therefore it can be seen that the third touch line 23 can include a plurality of line segments with different extension directions, and each line segment forms a non-right angle with the first direction h1. In comparison with a solution in which the third touch line 23 is perpendicular to the bending axis, such configuration in this example can reduce the stress applied on the third touch line 23 in a bent state, and thus a probability of cracking of the third touch line 23 in the bending region can be reduced, which can improve the reliability of the display panel.

The shape of the third touch line 23 shown in FIG. 7 is illustrated exemplarily, and any other solutions in which a non-right angle is formed between the third touch line 23 and the bending axis shall be included in the present disclosure, which will not be repeated herein.

Exemplarily, as shown in FIG. 7 and FIG. 8, the display panel further includes a fourth touch line 24 located between the third touch line 23 and the touch signal line 501.

In an embodiment, the fourth touch line 24 is adjacent to and connected to the touch signal line 501 located in the display region AA. In an embodiment of the present disclosure, as shown in FIG. 8, the fourth touch line 24 is located in the touch layer 5, that is, the fourth touch line 24 is formed by at least a part of the touch layer 5.

Exemplarily, the fourth touch line 24 can be provided in the same layer as the touch signal line 501 located in the display region AA, that is, the fourth touch line 24 can be formed by the touch signal line 501 directly extending from the display region AA to the non-display region NA. There is no need to change lines between the touch signal line 501 and the fourth touch line 24.

Figure 16:
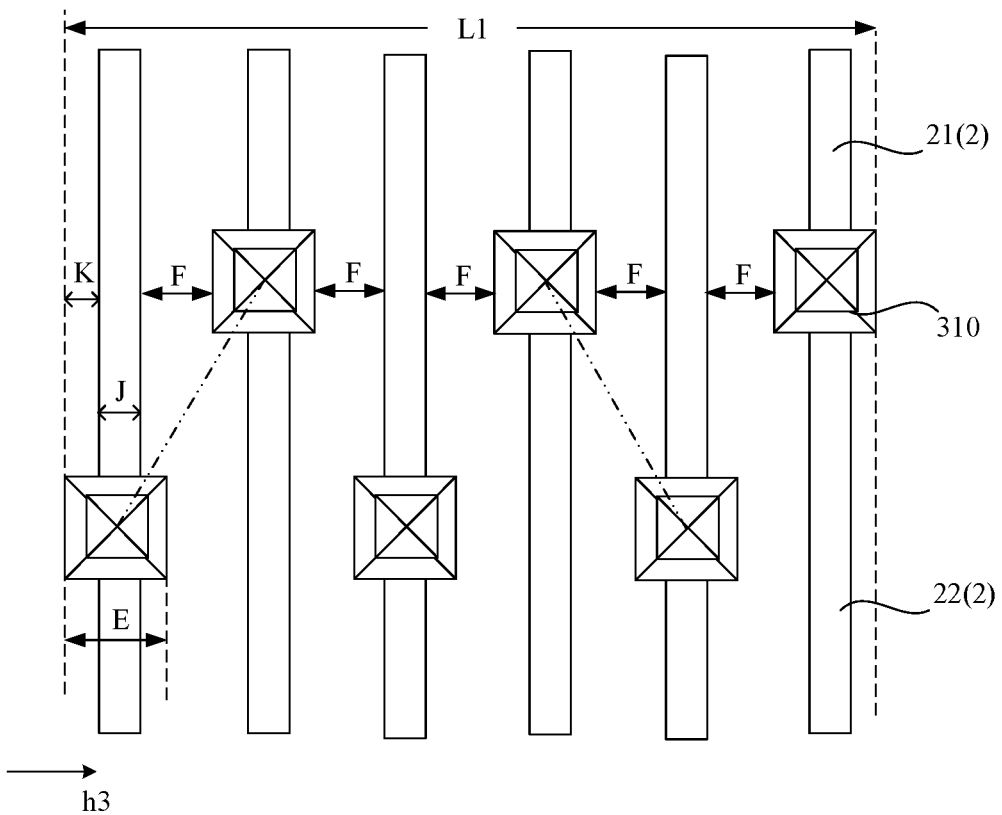
FIG. 16 is a top view of a non-display region of a display panel provided by another embodiment of the present disclosure.

As mentioned above, the first touch line 21 is electrically connected to the second touch line 22 through the first via 310 formed in the first dielectric layer 31; a plurality of first touch lines 21 is arranged in the first region Q1 along the third direction h3. A plurality of first vias 310 is provided in the second region Q2. FIG. 16 is a top view of a non-display region of a display panel provided by another embodiment of the present disclosure. As shown in FIG. 16, a non-zero angle is formed between a direction along which two first vias 310 corresponding to two adjacent first touch lines 21 are arranged and the third direction h3. With such configuration, the plurality of first vias 310 has a reduced length in the third direction h3. As shown in FIG. 16, two adjacent first vias 310 are arranged in either one of two directions indicated by dot dash lines.

In FIG. 16, a maximum length L1 of six touch lines in the third direction h3 satisfies:

$$L1=K+J+F+E+F+J+F+E+F+J+F+E=K+5F+3J+3E \quad (1),$$

where K denotes a distance between an edge of the touch line 2 and an edge of the first via 310 in the third direction h3, F denotes a minimum process spacing between two adjacent touch lines 2, J denotes a width of the touch line 2, and E denotes a length of the first via 310 in the third direction h3. When any two adjacent touch lines are arranged with a same interval, distances between the first via 310 formed in one touch line 2 and two adjacent touch lines 2 on left and right sides of this touch line 2 are equal, therefore, K=(E−J)/2, and substituting K=(E−J)/2 into formula (1), the following equation can be obtained:

$$L1=5F+2.5J+3.5E \quad (2).$$

Figure 17:
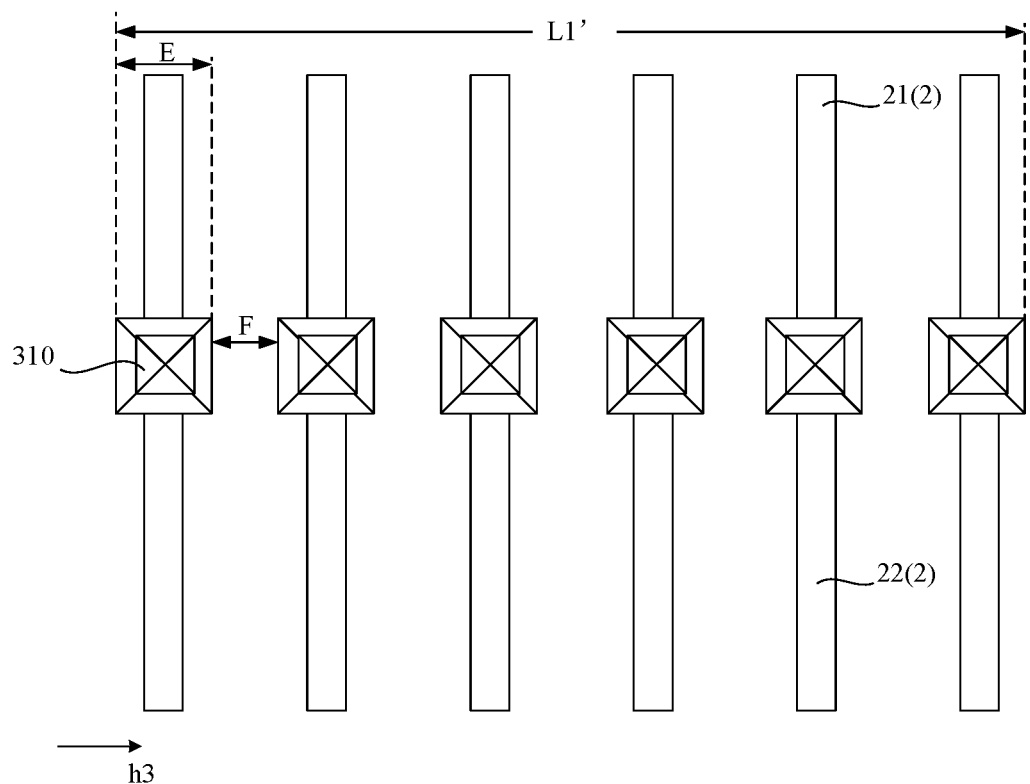
FIG. 17 is a top view of a non-display region of a display panel provided by another embodiment of the present disclosure.

FIG. 17 is a top view of a non-display region of a display panel provided by another embodiment of the present disclosure. As shown in FIG. 17, a plurality of first vias 310 is arranged along the third direction h3, and a maximum length L1' of six touch lines 2 in the third direction h3 satisfies:

$$L1'=5(E+F)+E=6E+5F \quad (3).$$

The difference between L1' and L1 can be obtained: L1'−L1=6E+5F−(5F+2.5J+3.5E)=2.5(E−J).

E>J, therefore, L1'>L1.

It can be seen that in this embodiment of the present disclosure, a non-zero angle is formed between a direction in which two first vias 310 corresponding to two adjacent first touch lines 21 are arranged and the third direction h3, so that the plurality of vias 310 can have a reduced length in the third direction h3.

Figure 18:
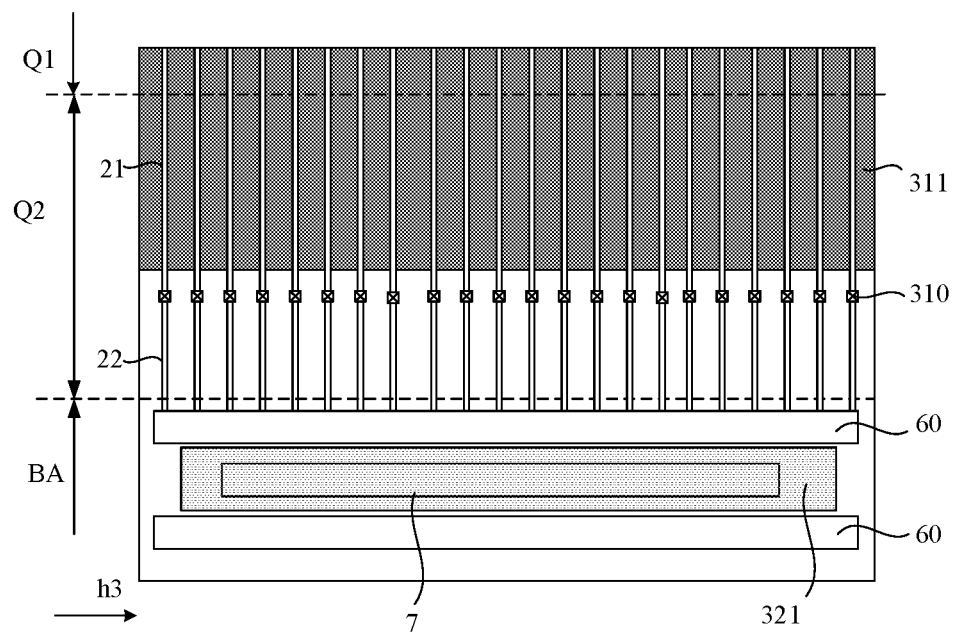
FIG. 18 is a top view of a non-display region of another a display panel provided by an embodiment of the present disclosure.

FIG. 18 is a top view of a non-display region of a display panel provided by another embodiment of the present disclosure. Exemplarily, as shown in FIG. 18, a second organic layer 321 is provided between two adjacent touch bonding pad groups 60. The display panel further includes a multiplexer unit 7 located at the side of the second region Q2 away from the first region Q1, and the second touch line 22 is electrically connected to a test circuit through the multiplexer unit 7.

Figure 19:
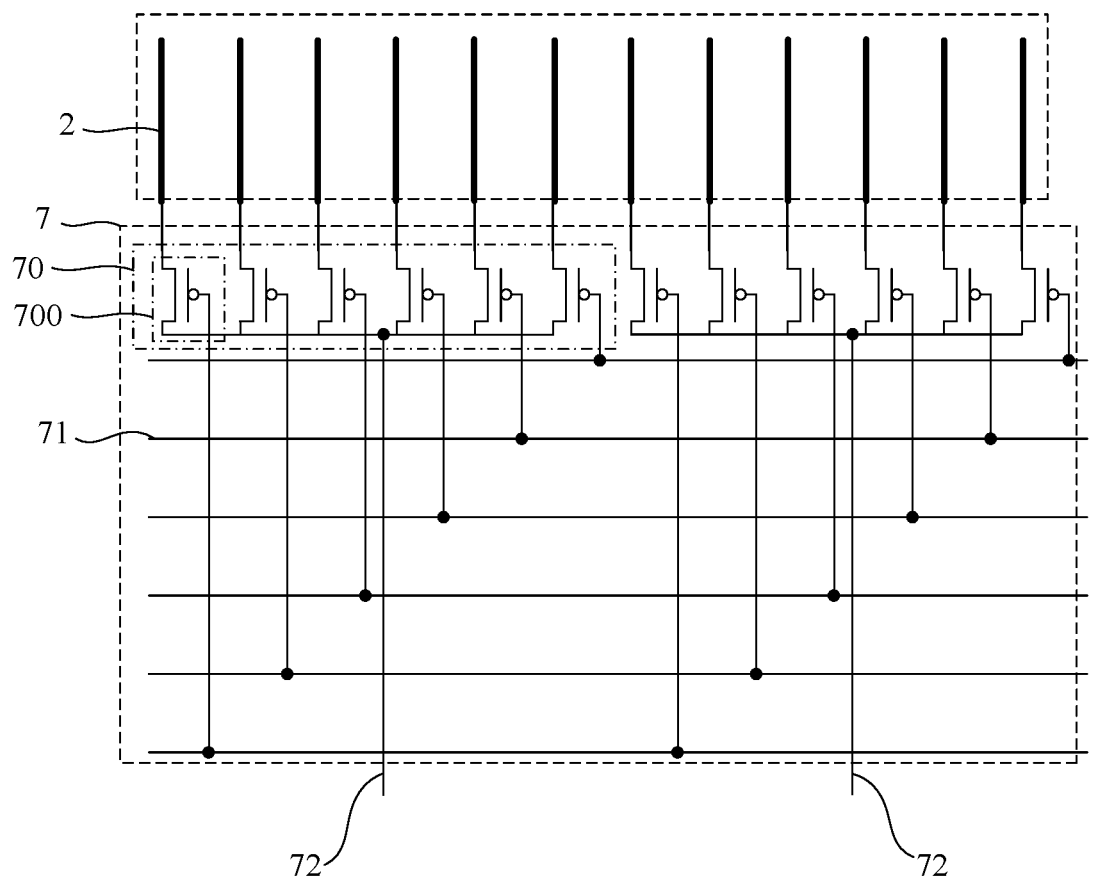
FIG. 19 is a schematic diagram of a circuit of a multiplexer unit provided by an embodiment of the present disclosure.

FIG. 19 is a schematic diagram of a circuit of a multiplexer unit provided by an embodiment of the present disclosure. As shown in FIG. 19, the multiplexer unit 7 includes at least one switch group 70. The switch group 70 includes at least two switches 700. FIG. 18 illustrates that the multiplexer unit 7 includes two switch groups 70 and each of the two switch groups 70 includes six switches 700. As shown in FIG. 18, the multiplexer unit 7 can further include a plurality of test control lines 71.

Multiple switches 700 in a same switch group 70 have first terminals electrically connected to a same test signal line 72, second terminals respectively electrically connected to different touch lines 2, and control terminals electrically connected to different test control lines 71.

After the layer structure in the display panel is formed, and before the integrated chip 200 is bound in the bonding region BA, a touch performance test can be performed on the display panel by means of a test circuit (not shown). When the touch performance test is performed on the display panel, the test circuit provides a touch test signal, and the touch test signal is transmitted to the multiplexer unit 7 through the test signal line 72. During the time when a test signal line 72 transmits the touch test signal, the test control line 71 provides a signal for turning on the switch 700 in a time-division manner. When any switch 700 is turned on, the test signal line 72 transmits the signal to the corresponding touch line 2 through the turned-on switch 700.

In this embodiment of the present disclosure, with the multiplexer unit 7 of the display panel, a test signal line 72 can provide a test touch signal to multiple touch lines 2 in a time-division manner, thereby avoiding that each touch line 2 is directly connected to the test circuit. In this way, the number of connection lines connecting the test circuit with the touch lines 2 can be reduced, thereby reducing an area occupied by the connection lines, and thus reducing an area of the non-display region of the display panel.

Exemplarily, the switch 700 can be a thin film transistor. The thin film transistor forming the switch 700 can be formed synchronously with the thin film transistor in the pixel driving circuit.

Exemplarily, as shown in FIG. 18, the multiplexer unit 7 is located at a side of the first via 310 away from the first region Q1. With such configuration, at a position where the multiplexer unit 7 is located, the touch line 2 is the second touch line located in the driving layer 41, and since the switch 700 is also located in the driving layer 41, such configuration can reduce a distance between touch line 2 and the switch 700 in the direction perpendicular to the plane of the display panel. When connecting the touch line 2 and the switch 700, a space occupied by a connection position of the touch line 2 and the switch 700 on the plane of the display panel can be reduced, which is beneficial to decrease of an area of the non-display region NA of the display panel.

Exemplarily, as shown in FIG. 18, in an embodiment of the present disclosure, the multiplexer unit 7 can be disposed between two adjacent touch bonding pad groups 60 to make full use of the space of the bonding region BA. The second organic layer 321 is located at a side of the switch 700 facing away from the substrate 1, and the second organic layer 321 can protect the switch 700.

Figure 20:
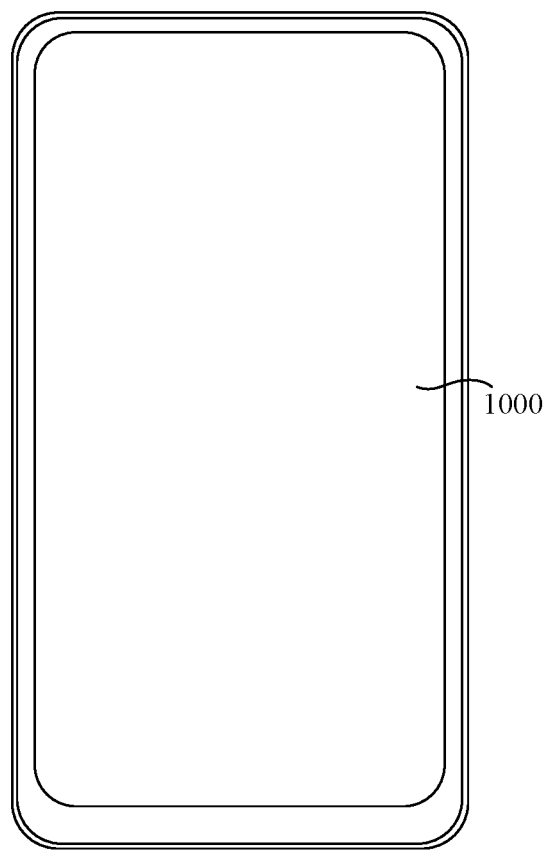
FIG. 20 is a schematic diagram of a display device provided by an embodiment of the present disclosure.

An embodiment of the present disclosure further provides a display device. FIG. 20 is a schematic diagram of a display device provided by an embodiment of the present disclosure. As shown in FIG. 20, the display device includes the above-described display panel 1000. A specific structure of the display panel 1000 has been described in detail in the above-mentioned embodiments, and will not be repeated herein. The display device shown in FIG. 20 is merely exemplarily illustrated, and the display device can be any electronic device with a display function, such as a mobile phone, a tablet computer, a notebook computer, an electronic paper book, or a television.

In the display device provided by the embodiments of the present disclosure, when the first touch line is electrically connected to the second touch line by passing the first dielectric layer, a position where the first touch line and the second touch line are electrically connected to each other is arranged in the second region, a thickness of the first dielectric layer in the second region is smaller than a thickness of the first dielectric layer in the first region, which can reduce an area occupied by a position where the first touch line and the second touch line are connected to each other, thereby reducing an area occupied by the touch line including the first touch line and the second touch line on the plane of the display panel.

The above are merely some embodiments of the present disclosure, which, as mentioned above, are not intended to limit the present disclosure. Within the principles of the present disclosure, any modification, equivalent replacement, improvement shall fall into the protection scope of the present disclosure.

What is claimed is:

1. A display panel, comprising:
   touch lines comprising at least one first touch line and at least one second touch line, wherein the at least one first touch line and the at least one second touch line are located in different layers; and
   a first dielectric layer located between the at least one first touch line and the at least one second touch line,
   wherein the display panel comprises a first region and a second region, a thickness A of the first dielectric layer in the first region in a direction perpendicular to a plane of the display panel, and a thickness B of the first dielectric layer in the second region in the direction perpendicular to the plane of the display panel satisfy: A>B>0, wherein in the second region, one of the at least one first touch line is electrically connected to one of the at least one second touch line through a via penetrating through the first dielectric layer, and a thickness of the via in the direction perpendicular to the plane of the display panel is smaller than a maximum thickness of the first dielectric layer both in the first region and in the second region in the direction perpendicular to the plane of the display panel.

2. The display panel of claim 1, wherein the first dielectric layer comprises a first organic layer, wherein a thickness C of the first organic layer in the first region and a thickness D of the first organic layer in the second region satisfy: C>D≥0.

3. The display panel of claim 2, wherein the thickness D of the first organic layer in the second region satisfies D>0, and one of the at least one first touch line is electrically connected to one of at least one second touch line through a first via formed in the first dielectric layer; and wherein the thickness of the first organic layer in the second region decreases along a direction from the first region to the second region, and the first via penetrates through at least the first organic layer in the second region.

4. The display panel of claim 3, wherein the first dielectric layer further comprises a first inorganic layer located between the first organic layer and the at least one first touch line; and
   wherein in the second region, one of the at least one first touch line is electrically connected to one of the at least one second touch line through a first via penetrating through both the first inorganic layer and the first organic layer.

5. The display panel of claim 2, wherein the thickness D of the first organic layer in the second region satisfies D=0, and the first dielectric layer further comprises a first inorganic layer; and
   wherein in the second region, one of the at least one first touch line is electrically connected to one of the at least one second touch line through a first via penetrating through the first inorganic layer.

6. The display panel of claim 1, further comprising:
   a substrate;
   a display layer;
   a touch layer located on a side of the display layer facing away from the substrate;
   wherein the display panel comprises a display region and a non-display region, wherein the non-display region comprises a line arranging region and a bonding region located at a side of the line arranging region away from the display region;
   wherein the display panel comprises touch electrodes located in the display region and pixel units located in the display region, the touch electrodes are located in the touch layer, and the pixel units are located in the display layer;
   wherein the touch lines are located in the line arranging region, the at least one first touch line is located in the touch layer, and the at least one second touch line is located in the display layer;
   wherein touch bonding pads are provided in the bonding region and electrically connected to the touch electrodes through the touch lines; and
   wherein the first region and the second region are located in the line arranging region, and the first region is located at a side of the second region close to the display region.

7. The display panel of claim 6, wherein the first dielectric layer comprises a first organic layer, wherein the first organic layer has a third region and a fourth region, wherein an orthographic projection of one of the at least one first touch line on a plane of the first organic layer is located in the third region and does not overlap with the fourth region; and
   wherein the first organic layer comprises a first side surface and a bottom surface, the first side surface is a surface of the first organic layer close to the bonding region, and the bottom surface is a surface of the first organic layer close to the substrate; and a first angle α1 formed between the first side surface of the first organic layer and the bottom surface in the third region and a second angle α2 formed between the first side surface of the first organic layer and the bottom surface in the fourth region satisfy: 0<α1<α2≤90°.

8. The display panel of claim 7, wherein 0<α1≤60°.

9. The display panel of claim 6, wherein the first dielectric layer comprises a first organic layer and a first inorganic layer; and in the second region, a thickness D of the first organic layer is equal to 0, and one of the at least one first touch line is electrically connected to one of the at least one second touch line through a first via penetrating through the first inorganic layer; and wherein each of the at least one first touch line comprises a first touch sub-line, a second touch sub-line, and a third touch sub-line, wherein the first touch sub-line comprises a first end and a second end that are arranged along an extension direction of the first touch sub-line, wherein the first end overlaps with the first organic layer, and the second end does not overlap with the first organic layer; the second touch sub-line is located at a side of the first touch sub-line close to the display region, the third touch sub-line is located at a side of the first touch sub-line close to the bonding region, and the second touch sub-line is electrically connected to the third touch sub-line through the first touch sub-line.

10. The display panel of claim 9, wherein the at least one first touch line comprises a plurality of first touch lines provided in the first region, wherein the plurality of first touch lines comprises first type of touch lines and second type of touch lines, wherein the first type of touch lines and the second type of touch lines are alternately arranged in a direction parallel to a plane of the substrate; and wherein for two adjacent first touch lines of the plurality of first touch lines, the first touch sub-line of one of the first type of touch lines and the first touch sub-line of one of the second type of touch lines are located in different layers.

11. The display panel of claim 10, wherein in the display region and in the first region, the touch layer comprises a first touch conductive layer and a second touch conductive layer, and one of the first touch conductive layer and the second touch conductive layer is located on a side, close to the substrate, of the other one of the first touch conductive layer and the second touch conductive layer; and wherein for two adjacent first touch lines of the plurality of first touch lines, the first touch sub-line of one of the first type of touch lines is located in the first touch conductive layer, and the first touch sub-line of one of the second type of touch lines is located in the second touch conductive layer.

12. The display panel of claim 11, wherein the touch layer further comprises a touch insulating layer located between the first touch conductive layer and the second touch conductive layer and comprising a second via and a third via;

wherein in each of the first type of touch lines, the second touch sub-line and the third touch sub-line are located in the second touch conductive layer, the first touch sub-line is located in the first touch conductive layer, the second touch sub-line is electrically connected to the first touch sub-line through the second via, and the third touch sub-line is electrically connected to the first touch sub-line through the third via; and wherein in each of the second type of touch lines, the first touch sub-line, the second touch sub-line, and the third touch sub-line are all located in the second touch conductive layer.

13. The display panel of claim 6, wherein the display layer comprises a first metal layer and a second metal layer located on a side of the first metal layer close to the touch layer, and the at least one second touch line is located in the first metal layer.

14. The display panel of claim 6, wherein each of the touch bonding pads comprises a first conductive layer and a second conductive layer that are electrically connected to each other, wherein the first conductive layer is located in the touch layer, the second conductive layer is located in the display layer, and the at least one second touch line and the second conductive layer are located in a same layer.

15. The display panel of claim 14, further comprising:
a second dielectric layer provided between the first conductive layer and the second conductive layer,
wherein the second dielectric layer is an inorganic insulating layer.

16. The display panel of claim 14, wherein a plurality of touch bonding pad groups are provided in the bonding region, wherein each group of the plurality of touch bonding pad groups comprises at least two of the touch bonding pads arranged along a first direction, and the plurality of touch bonding pad groups is arranged along a second direction intersecting with the first direction.

17. The display panel of claim 16, further comprising:
a multiplexer unit located at a side of the second region away from the first region,
wherein the at least one second touch line is electrically connected to a test circuit through the multiplexer unit; and
wherein a second organic layer is provided between two adjacent touch bonding pad groups of the plurality of touch bonding pad groups, and the multiplexer unit is located between two adjacent touch bonding pad groups.

18. The display panel of claim 6, wherein the non-display region further comprises a bending region located at a side of the first region close to the display region, and at least one third touch line electrically connected to the at least one first touch line is provided in the bending region and located in the display layer.

19. The display panel of claim 1, wherein the at least one first touch line is electrically connected to the at least one second touch line through one of first vias formed in the first dielectric layer; the at least one first touch line comprises a plurality of first touch lines arranged along a third direction in the first region; at least two of the first vias are provided in the second region; and two of the first vias corresponding to two adjacent first touch lines of the plurality of first touch lines are arranged in a direction forming a non-zero angle with the third direction.

20. A display device, comprising a display panel comprising:
touch lines comprising at least one first touch line and at least one second touch line, wherein the at least one first touch line and the at least one second touch line are located in different layers; and
a first dielectric layer located between the at least one first touch line and the at least one second touch line,
wherein the display panel comprises a first region and a second region, a thickness A of the first dielectric layer in the first region in a direction perpendicular to a plane of the display panel, and a thickness B of the first dielectric layer in the second region in the direction perpendicular to the plane of the display panel satisfy: A>B>0, wherein in the second region, one of the at least one first touch line is electrically connected to one of the at least one second touch line through a via penetrating through the first dielectric layer, and a thickness of the via in the direction perpendicular to the plane of the display panel is smaller than a maximum thickness of the first dielectric layer both in the first region and in the second region in the direction perpendicular to the plane of the display panel.

* * * * *